(12) United States Patent
Harville et al.

(10) Patent No.: US 7,433,327 B2
(45) Date of Patent: Oct. 7, 2008

(54) METHOD AND SYSTEM FOR COORDINATING COMMUNICATION DEVICES TO CREATE AN ENHANCED REPRESENTATION OF AN ONGOING EVENT

(75) Inventors: Michael Harville, Palo Alto, CA (US); Michele Covell, Palo Alto, CA (US); Donald O. Tanguay, Jr., Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1155 days.

(21) Appl. No.: 10/683,718

(22) Filed: Oct. 9, 2003

(65) Prior Publication Data

US 2005/0078172 A1    Apr. 14, 2005

(51) Int. Cl.
*H04L 12/28* (2006.01)
*H04L 12/56* (2006.01)

(52) U.S. Cl. .................. 370/260; 370/252; 379/158

(58) Field of Classification Search ............. 370/338, 370/252, 230, 235, 260, 486; 709/203; 340/457.1; 379/198, 156, 158
See application file for complete search history.

(56) References Cited

U.S. PATENT DOCUMENTS

| 2004/0001579 A1* | 1/2004 | Feinberg et al. ............ 379/156 |
| 2004/0022222 A1* | 2/2004 | Clisham .................... 370/338 |
| 2007/0057781 A1* | 3/2007 | Breed ...................... 340/457.1 |

* cited by examiner

*Primary Examiner*—John Pezzlo

(57) ABSTRACT

In one embodiment, the present invention recites a coordinating component for creating an enhanced representation of an ongoing event using inputs from a communication session established between a plurality of communication devices. A first input port receives a first input from a first of the plurality of communication devices. A second input port receives a second input from a second of the plurality of communication devices. The first of the plurality of communication devices and the second of the plurality of communication devices do not have a prior association. A generator for selectively combining the first input and the second input creates an enhanced representation of the ongoing event. The enhanced representation is then output from an output port.

38 Claims, 10 Drawing Sheets

METHOD AND SYSTEM FOR COORDINATING COMMUNICATION DEVICES TO CREATE AN ENHANCED REPRESENTATION OF AN ONGOING EVENT

TECHNICAL FIELD

The present claimed invention relates to the capture and enhancement of events using sensors. More specifically, the present claimed invention relates to coordinating communication devices with no prior association in order to produce an enhanced representation of an event sensed by these devices.

BACKGROUND ART

Enhanced environments are often used to provide a media-rich experience for participants in meetings, lectures, "virtual tours", and other ongoing events. For example, a special room that is equipped with enhanced audio and/or visual capabilities is used for meetings. These rooms may include microphone and speaker systems, as well as visual capture and presentation systems and computer resources such as Internet connectivity. Using these rooms enhances the ability of meeting participants to present and participate in a discussion.

However, these enhanced environments are limited in that they utilize an expensive, static infrastructure. Because of the time and effort required to install them, the visual and audio systems are typically installed in a substantially permanent manner. As a result, meetings and other ongoing events that use these enhanced media capabilities are limited to being conducted at one of these specially equipped rooms. This can be especially inconvenient in the case of a multi-site conference or other event if some of the participants do not have access to one of these specially equipped rooms. Alternatively, audio/visual equipment can be brought into a room to provide enhanced media capture and presentation capabilities for a meeting or other ongoing event. However, procuring and setting up these enhanced media capture and presentation systems can be inconvenient for many users and are not practical for impromptu meetings and spontaneous events. Some prior methods have attempted to bundle the equipment needed for enhanced media capture and presentation into a single portable device. Because such devices concentrate all capture sensors into a single location, they often fail to adequately cover the diverse happenings within an ongoing events. Further, they are less able to provide personalized audio output, visual display, or audio/visual capture for each of the individual event participants.

The enhanced media capabilities of these special rooms are sometimes used to capture a record of an ongoing event. Additional services for event participants may include summarizing and indexing the occurrences within an event for later reference or for the benefit of others who did not attend the event. These services are only available for events held in these specialized locations. There are also portable devices that can be brought into a room and used for capturing the occurrences within an ongoing event. However, these devices can also be inconvenient for many users to procure and set up for the event and are not practical for impromptu or spontaneous events. By concentrating all capture sensors into a single device, these devices have limited coverage of the event happenings, and are often limited in their ability to provide records of the event that are personalized to each participant or viewer. Thus, current methods for providing enhanced environments for facilitating ongoing events such as meetings and lectures, and/or for capturing, summarizing, and indexing the happenings within these events, are inadequate.

DISCLOSURE OF THE INVENTION

In one embodiment, the present invention recites a coordinating component for creating an enhanced representation of an ongoing event using inputs from a communication session established between a plurality of communication devices. A first input port of the coordinating component receives a first input from a first of the plurality of communication devices. A second input port receives a second input from a second of the plurality of communication devices. The first of the plurality of communication devices and the second of the plurality of communication devices do not have a prior association. A generator for selectively combining the first input and the second input creates an enhanced representation of the ongoing event. The enhanced representation is then output from an output port.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

MODES FOR CARRYING OUT THE INVENTION

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

General Description of a Communication Device

Figure 1:
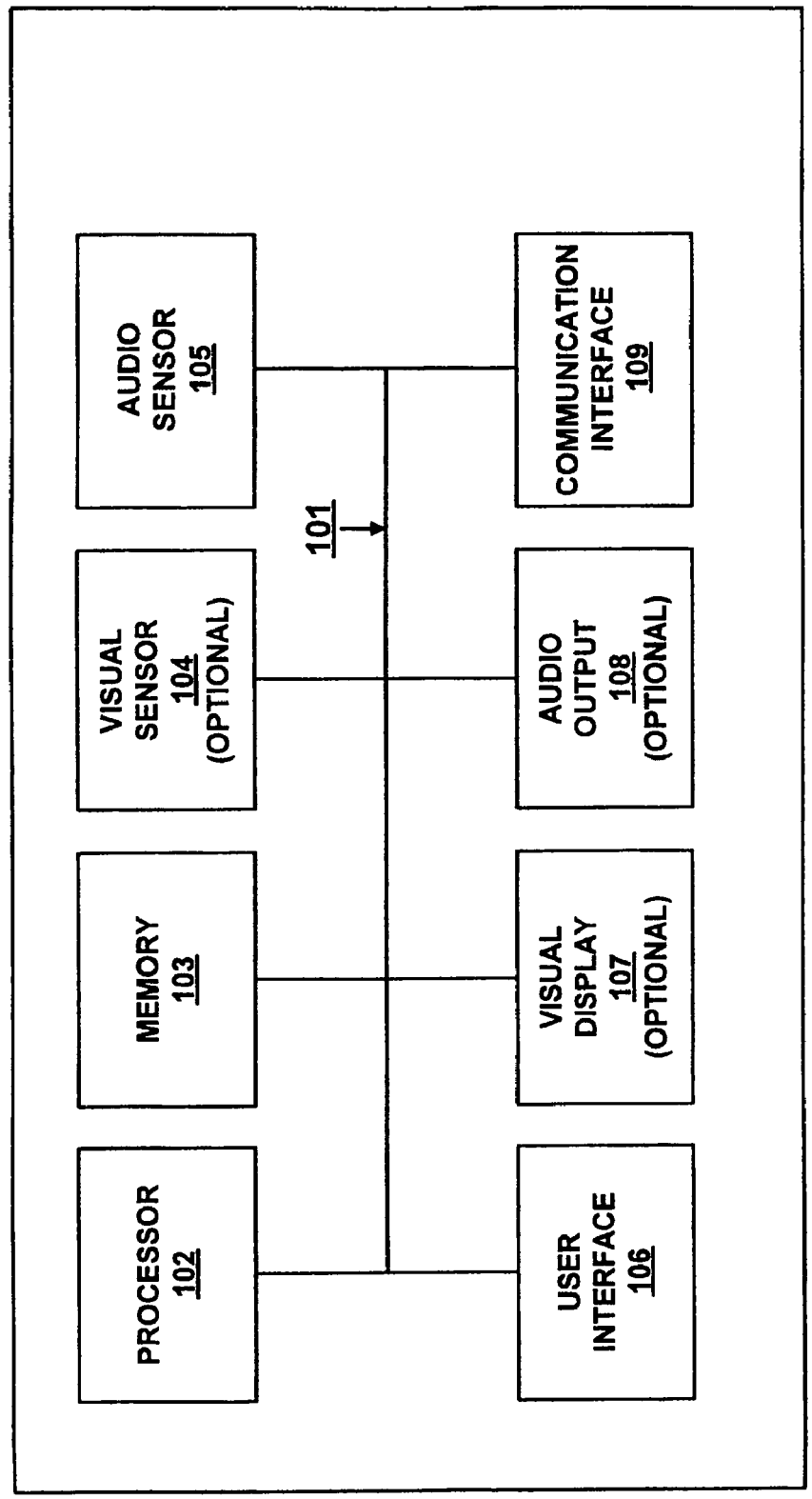
FIG. 1 is a block diagram of a communication device utilized in accordance with embodiments of the present invention.

The following discussion will begin with a general description of a communication device used to enhance and/or capture meetings, social gatherings, and other ongoing events. FIG. 1 is a block diagram of a communication device 100 that is used in embodiments of the present invention. With reference to FIG. 1, portions of the present invention are comprised of computer-readable and computer-executable instructions that reside, for example, in communication device 100 that is used as a part of a communication network (not shown). In the embodiment of FIG. 1, communication device 100 includes an address/data bus 101 for conveying digital information between the various components, a central processor unit (CPU) 102 for processing the digital information and instructions, and a memory 103 for storing the digital information and instructions for processor 102. It is appreciated that memory 103 may comprise volatile memory, e.g., random access memory (RAM), static RAM (SRAM), dynamic RAM (DRAM), synchronous dynamic RAM (SDRAM), double data rate RAM (DDR RAM), etc., in embodiments of the present invention. Alternatively, memory 103 may comprise non-volatile memory, e.g., read only memory (ROM), programmable ROM, electronically programmable ROM (EPROM), electrically erasable ROM (EEPROM), flash memory (a type of EEPROM), etc. Furthermore, in one embodiment, memory 103 may comprise a removable memory device. It should be noted that software instructions for controlling communication device 100, e.g., communication client software, and for storing user preferences, user identity information, data derived from training based on the user's behavior, etc., can be stored in memory 103. Memory 103 can also store software instructions for performing a method for coordinating communication devices to create enhanced representations of an ongoing event of the present invention.

In embodiments of the present invention, communication device 100 optionally includes a visual sensor 104, e.g., an integrated or attached digital camera, that is coupled with bus 101 for capturing visual images. This allows, for example, participants of a meeting to see other participants who may be at another physical location as well as to capture other visual information such as meeting presentations, user gestures, etc. In the embodiment of FIG. 1, communication device 100 further comprises an audio sensor (e.g., a microphone) 105 coupled with bus 101 for capturing audio information.

In the embodiment of FIG. 1, device 100 also comprises a user interface 106 for controlling communication device 100. In embodiments of the present invention, user interface 106 may comprise buttons, a keyboard, mouse, trackball, alpha-numeric keypad, track pad, a joy stick, an optical tracking device, a touch screen, etc., as well as computer software/firmware for converting user input into electronic instructions for communication device 100. In embodiments of the present invention, user control of communication device 100 may be performed using visual sensor 104 and/or audio sensor 105 only.

Other devices optionally coupled to bus 101 include a visual display device 106 for displaying information, e.g., video, graphics, and/or alpha-numeric characters, to a user of communication device 100, and an audio output device 108 for emitting an audible signal. In embodiments of the present invention, audio output device 108 comprises, for example, a speaker, an audio jack, headphones, a sound card, etc.

Communication device 100 also comprises a communication interface 109 for communicatively coupling communication device 100 in a communication network. The set of computing devices in the communication network may consist solely of communication devices 100, but may also include other types of computers such as network servers, database servers, storage servers, etc. In embodiments of the present invention, communication interface 109 can include wired and/or wireless communication functionality. For example, in one embodiment, communication interface 109 is a serial communication port. Alternatively communication interface 109 may be compliant with one of a number of other well known communication interfaces, e.g., a parallel port, an Ethernet adapter, a FireWire (IEEE 1394) interface, a Universal Serial Bus (USB) port, a small computer system interface (SCSI), an infrared (IR) communication port, a Bluetooth wireless communication adapter, a cellular telephone modem, a radio transceiver, a broadband connection, a satellite link, an Internet feed, a cable modem, a digital subscriber line (DSL) modem, and the like. Additionally, communication interface 109 may be compliant with a variety of well known communication standards and protocols, e.g., the transmission control protocol/internet protocol (TCP/IP), code division multiple access (CDMA), the global system for mobile communication (GSM), the Institute of Electrical & Electronics Engineers (IEEE) 802.11 standards, etc. Embodiments of the present invention may also utilize non-standard communication protocols such as visible or infrared light, radio waves, audio waves, etc., to allow them to communicate with each other directly.

It is appreciated that communication device 100 of FIG. 1 is exemplary only and that various implementations of a communication device 100 can be used in embodiments of the present invention. In embodiments of the present invention, communication device 100 is a non-dedicated device that is used to create an ad-hoc network. For purposes of the present invention, the term "non-dedicated" means that the communication devices 100 are not solely intended for creating an enhanced representation of a meeting or other ongoing event. In other embodiments of the present invention, communication devices 100 are dedicated devices used for creating an enhanced representation of a meeting or other ongoing event. For the purposes of the present invention, the term "dedicated" means that the communication devices 100 are specifically used to create an enhanced representation of a communication session. However, in these embodiments, the dedicated communication devices 100 used to create an enhanced representation of a particular ongoing event do not have a specific prior association, as discussed below.

In some embodiments, communication device 100 is a commercially available cellular telephone with integrated or attached displays and cameras. Alternatively, in embodiments of the present invention, communication device 100 is a personal digital assistant (PDA) with integrated or attached audio and/or visual input/output devices and a network communication interface, or a laptop computer with integrated or attached cameras and networking cards, etc. In embodiments of the present invention, communication device 100 is a device that a user typically owns and frequently carries such as a video-capable cellular telephone or PDA as described above. This facilitates using communication device 100 to enhance and capture events such as impromptu meetings or other spontaneous happenings. However, in other embodiments, communication devices 100 may also be dedicated devices that are specifically used to provide an enhanced media environment for meetings or other ongoing events. For example, communication device 100 may be provided to users to create an enhanced representation of a meeting or to facilitate enhancement and/or capture of the meeting. However, the dedicated communication devices 100 do not have a specific prior association with each other prior to initiating the meeting in embodiments of the present invention.

Communication Devices Lacking Prior Association

The assessment of whether or not a set of devices have a prior association is dependent on the application under consideration that makes use of these devices. For a given application, a set of devices are said herein to have a "prior association" if they consider themselves, or are considered by some other entity, to form a group of devices that are specially related to each other for use together in that application. A special relation exists between such devices because some entity, such as a software program or other computer-based system, can be predicted, prior to starting the application, to use some combination of these devices, rather than and to the exclusion of other equivalent devices, to accomplish its goals.

For the invention described herein, the application of interest is the creation of an enhanced representation of an ongoing event from inputs collected from some set of devices. Embodiments of the present invention perform this application for devices with no prior association for such applications. In embodiments of the present invention, human selection of input devices, at a time concurrent with the ongoing event, is needed to form the association between devices to be used together to create an enhanced representation of the event. The invention first initializes a specific session for coordinating the devices, and then waits for human action to cause select communication devices 100 to attempt to join, or to express their interest in joining, this specific ongoing event.

For purposes of the present invention, the term "human selection" may comprise a human transporting a communication device 100 in proximity to a network for providing an enhanced representation of an ongoing event. In embodiments of the present invention, this may also comprise a user bringing a communication device 100 in proximity to other communication devices 100 to form an ad-hoc communication network. In another embodiment, human selection comprises a user intentionally initiating the joining or creating of a network for providing an enhanced representation of an ongoing event. In embodiments of the present invention, the intentional initiating comprises a user responding to a prompt from a communication device 100 (e.g. depressing a particular key of the communication device), or causing communication device 100 to find a communication network. In embodiments of the present invention, a user can identify (e.g. by manually operating the communication 100) a specific meeting or other ongoing event to join, specify the participants that are allowed to participate in the ongoing event, or cause the communication device 100 to list ongoing events which may be joined by the user.

The complete set of cellular telephones are an example of a set of devices with no prior association for this application, because it cannot be predicted in advance which particular subset of cellular telephones will be used together in any particular instance of this application. Instead, the subset used in any given instance of the application is dependent on which users of the telephones indicate that they want their devices to participate together for creating an enhanced representation of some particular event. All other cellular telephones will be ignored for this instance of the application, but some of those ignored in this instance may not be ignored in the next instance, depending on which people indicate that they want to participate at that time. A similar argument applies to PDAs, laptop or tablet computers, and other computing devices that are non-dedicated implementations of communication device 100. For example, the communication devices can provide an enhanced representation of an ad-hoc meeting without the necessity of a fixed, enhanced media environment or a dedicated communication network.

Dedicated implementations of communication device 100 may also lack a prior association, and therefore are applicable in the invention. For example, even if every employee of a company is issued a dedicated communication device 100 for providing input to an application for creating enhanced representations of events such as meetings, it cannot be predicted which subset of these devices will be used in any particular instance of the running application. Furthermore, if a stack of such dedicated devices were to be stored for use in a given meeting room, it still may be the case that they have no prior association for the purposes of this invention, if it is true that the application that creates enhanced representations of events from inputs from these devices does not assume that any or all of these devices may be used to provide input in each instance of the running application. In this last scenario, the devices may also be non-dedicated, and would still be assumed to have no prior association.

One example of a set of devices that have a prior association for the purposes of this invention, and therefore are not an adequate implementation of the invention, is a set of statically installed cameras and/or microphones in a particular enhanced media environment such as a meeting or lecture room. A system that wishes to use such devices to create an enhanced representation of an ongoing event in this environment may group such devices in advance, and may assume that input from some or all of them are all that need to be considered, to the exclusion of input from all other cameras and microphones in the world. Another example of devices with prior association for the purposes of this invention are dedicated portable devices that assume, in advance of any particular instance of their use, that they should coordinate with members of a particular set of other such devices, to the exclusion of other equivalent devices, in order to create an enhanced representation of an ongoing event. Similarly, if another entity, such as a software program running on a networked server, maintains a list of such portable devices to use whenever the entity performs the application, and if the entity excludes use of other equivalent portable devices for the application, then the set of portable devices that may be used by the entity may be said to have a prior association, and are therefore not an adequate implementation of the present invention.

Creating an Enhanced Representation of an Ongoing Event

The present invention is concerned with selecting and/or combining from a plurality of sensor inputs to create an "enhanced representation" of an ongoing event. For purposes of the present invention, an "ongoing event" is a set of observable happenings in the world that occur over some non-instantaneous period of time. For the present invention, these happenings are typically localized to one or more physical sites, so that the happenings at each site may be observed by one or more of communication devices 100. Physical sites or locations are considered distinct in this invention if it is difficult for people at one such site to see and/or hear people at another site directly, without the assistance of special equipment such as cameras, microphones, displays, or speakers. Examples of ongoing events with which the invention is concerned include, but are not limited to, a business or other meeting occurring within a single room or other single site, a teleconference meeting for business or other purposes occurring across multiple physical sites, a lecture or other type of presentation, a dramatic or other type of performance, a birthday party or other type of social gathering, and the happenings in Times Square or some other localized site. The ongoing event that is the subject of the enhanced representation may begin before or after a set of communication devices 100 is coordinated as described herein to sense happenings in the world, and it may end before or after this coordination is terminated.

For purposes of the present invention, the term "enhanced representation" means a data representation, constructed through selection and/or combination from a plurality of inputs, that captures and conveys an ongoing event better, as determined by pre-defined parameters, than any one of the individual inputs. In many embodiments, an enhanced representation may be accurately described as a distillation of the information captured by the inputs, such that the enhanced representation contains less information than the totality of the inputs, but with the most "interesting" of this information, according to some pre-defined criteria, being preserved. The enhanced representation also captures and conveys the ongoing event better than a simple summation of the individual inputs. For example, in embodiments of the current invention in which a group of people use communication devices 100 in a meeting, wherein each communication device is equipped with an audio sensor, an enhanced representation of the audio content of the meeting might be based upon selection of the audio input, for each time point in the meeting, with the highest audio level and/or that seems most likely to be capturing the voice of the currently speaking person with highest fidelity. The enhanced representation of the audio content of the meeting would therefore consist of a single audio stream of approximately the same duration as the meeting, but that is composed by concatenating together segments of audio input streams of more limited duration captured by different communication devices present at the meeting. In contrast, for this example, an audio input from just one of the communication devices, spanning all or a portion of the meeting, would not be considered an "enhanced representation" for purposes of the current invention. A simple additive combination of the audio inputs, where the coefficients of the addition never change during the meeting, as is done in typical audio teleconferencing applications, would also not be considered an enhanced representation for the purposes of the current invention. Additional examples of enhanced representations of ongoing events, composed from audio and/or video inputs, will be discussed below. It should be understood that these examples are not meant to be interpreted as a comprehensive listing of enhanced representations in accordance with embodiments of the present invention.

General Description of a Method for Coordination a Communication Session

Figure 2:
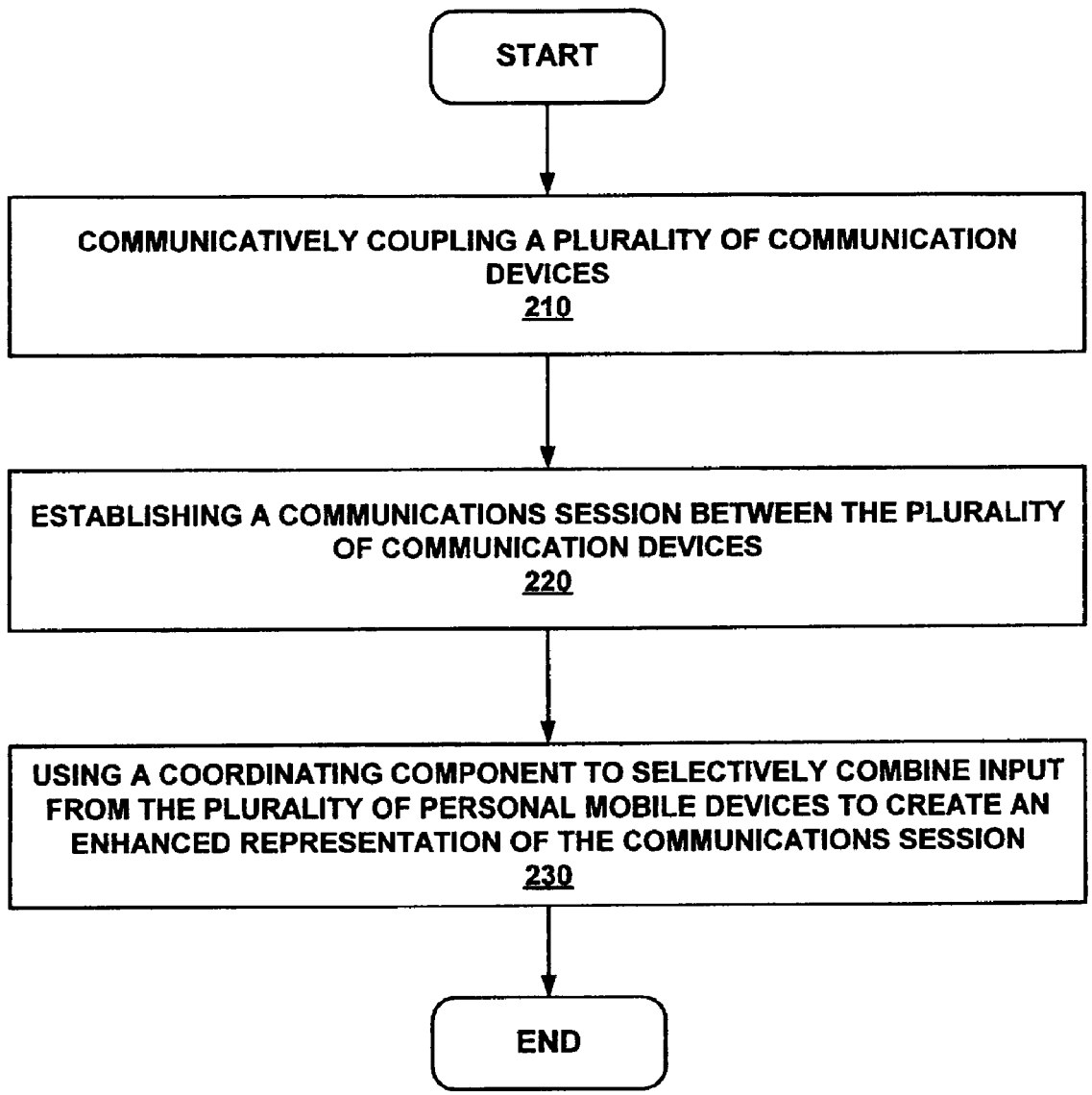
FIG. 2 is a flow chart of a method 200 for coordinating a communication session between communication devices in accordance with embodiments of the present invention.

FIG. 2 is a flow chart of a method 200 for coordinating a communication session between communication devices 100 in accordance with embodiments of the present invention. In step 210 of flow chart 200, a plurality of communication devices 100 are communicatively coupled. In embodiments of the present invention, communication devices, e.g., communication device 100 of FIG. 1, can be communicatively coupled using, for example, network connection device 109. However, as will be described in greater detail in the following discussion, other methods for communicatively coupling a plurality of communication devices 100 can be utilized in accordance with embodiments of the present invention. In embodiments of the present invention, the communication devices 100 do not have a prior association with other communication devices 100 used in the communication session.

In step 220, of FIG. 2, a communication session is established between the plurality of communication devices 100. As will be described in greater detail in the following discussion, a variety of protocols may be initiated to establish a communication session in accordance with embodiments of the present invention. As an example, the plurality of communication devices 100 can perform a "handshake" process to negotiate communicative connections amongst themselves. As another example, each communication device 100 may establish a communicative connection with a single coordinating entity, without forming such connections directly between communication devices 100. In this case, any information to be communicated from one communication device 100 to another would be relayed by the coordinating entity.

In step 230 of FIG. 2, inputs from the plurality of communication devices 100 are selectively combined to create an enhanced representation of the ongoing event that is the subject of the inputs to the communication session. Embodiments of the present invention are well suited, for example, for capturing the events of a meeting, for selecting between a plurality of inputs of the meeting and outputting an enhanced representation of the meeting, and for integration with a meeting capture/summarization system. In embodiments of the present invention, each user can define parameters for his/her communication device 100 which facilitate creating a customized record of the meeting. For example, a communication device 100 can be used by a meeting participant to denote happenings within the meeting that are important to that participant. The user can later access a record of the meeting in which the happenings that were denoted are emphasized. Each participant can denote different happenings and can access a unique record of the meeting. Embodiments of the present invention are also well suited for creating enhanced representations of ongoing events other than meetings, from a communication session between a plurality of communication devices 100.

Coordinating a Plurality of Communication Devices at a Single Physical Location

Figure 3:
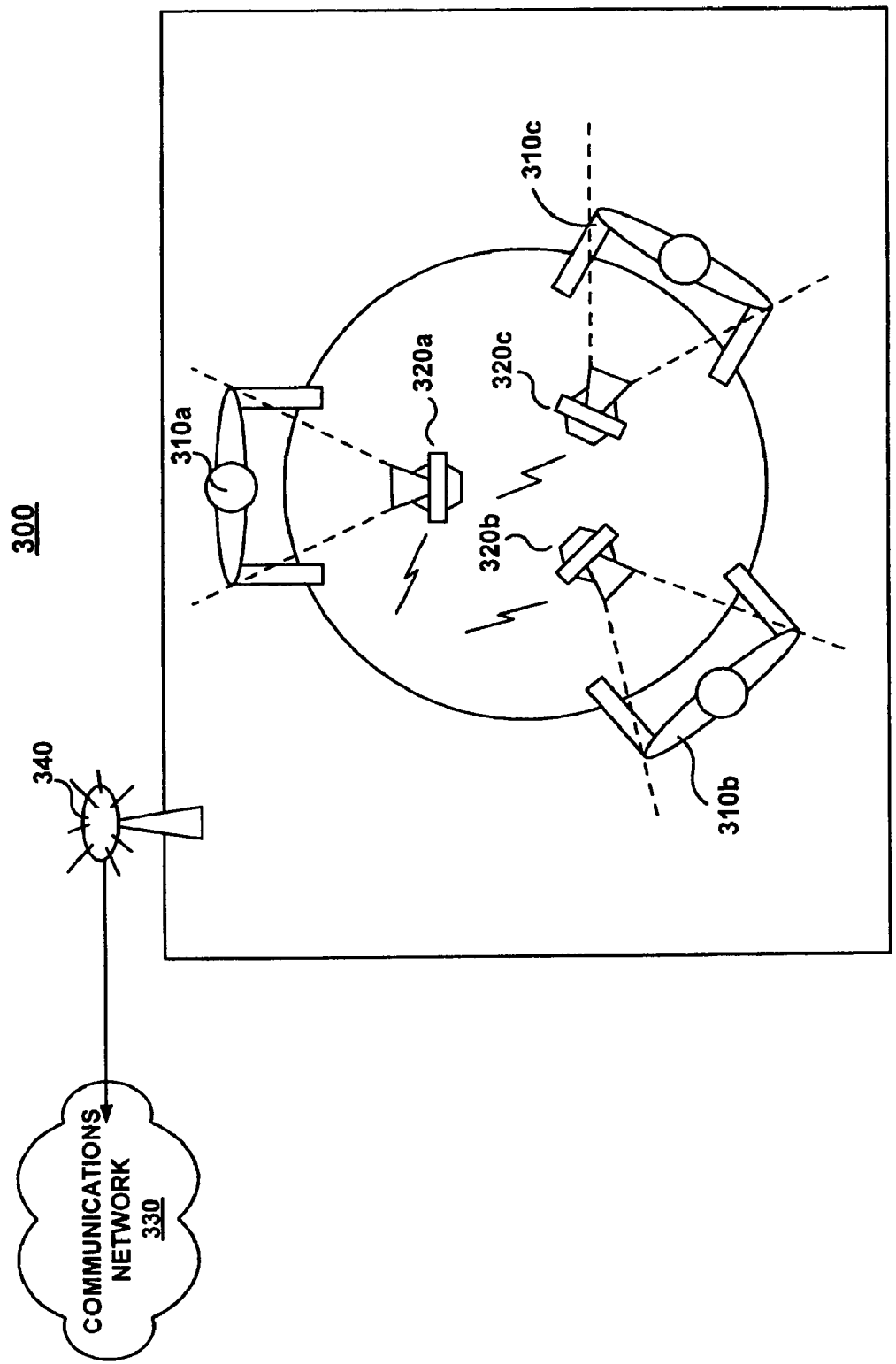
FIG. 3 is a diagram of a plurality of communication devices communicatively coupled in accordance with embodiments of the present invention.

FIG. 3 shows a plurality of communication devices 100 at a single physical location, communicatively coupled in accordance with embodiments of the present invention. In FIG. 3, a plurality of users 310a, 310b, and 310c are conducting a meeting using a plurality of communication devices 320a, 320b, and 320c as described herein with reference to FIG. 1. In the embodiment of FIG. 3, the communication devices 320a-320c are communicatively coupled with each other using a wireless communication interface, e.g., communication interface 109 of FIG. 1. Alternatively, the communication devices 320a-320c may be communicatively coupled using a wired communication interface or a non-standard communication protocol as described herein with reference to FIG. 1.

In the embodiment of FIG. 3, the communication devices 320a-320c are also communicatively coupled with a communication network 330 via a network connection 340, e.g., a wireless hub. In embodiments of the present invention, communication network 330 comprises the Internet, a cellular telephone network or other communication network. In embodiments of the present invention, communication network 330 can be communicatively coupled with a computer network, e.g., a local area network (LAN), a wide area network (WAN), or the like. In other embodiments of the present invention, communication devices 320a-320c are communicatively coupled with communication network 330 using a wired network connection. In other embodiments, communication devices 320a-320c may communicatively coupled using, for example, infra-red communication interfaces.

It is noted that in embodiments of the present invention, communication devices 320a-320c are not previously associated with each other for the purposes of creating an enhanced representation of meetings or other ongoing events. For example, communication device 320a may be a cellular telephone equipped with visual capture and display devices, communication device 320b may be a PDA equipped with visual capture and display devices, and communication device 320c may be a laptop computer equipped with visual capture and display devices. These are devices that users might typically carry with them but that are not dedicated or solely intended to be used for creating an enhanced representation of a meeting and are not specially associated with each other for such purposes. However, in embodiments of the present invention, these devices can be used to create an ad-hoc network that can create an enhanced representation of a meeting or other ongoing event, and transmit that enhanced representation to another physical site communicatively coupled with the ad-hoc network. Additionally, these devices can be used to store a record of the enhanced representation of the meeting by integrating the ad-hoc network with meeting capture/summarization systems, and they can be used for facilitating creation of a user customized record of the meeting. Furthermore, as discussed in the next section, these devices can be coordinated with an enhanced media environment to provide a media-rich environment for participants in a meeting.

In FIG. 3, each of the users 310a-310c has positioned his/her respective communication device 320a-320c such that the user is in the field of view (indicated by the dotted lines) of a visual sensor of the communication device, e.g., visual sensor 104 of FIG. 1. Thus, in the embodiment of FIG. 3, each of the communication devices 320a-320c has a view of only its respective user. However, more than one participant can be included within the field of view of visual sensor 104 in embodiments of the present invention.

Embodiments of the present invention enhance the ability of meeting participants to present and participate in a discussion. For example, users 310a-310c can establish impromptu meetings with enhanced media capabilities, e.g., with the ability to present audio and/or visual data to the other users using mobile communication devices 320a-320c. Enhanced audio and video, and informative views of the meeting events, can be constructed or selected by the invention and provided to participants via the visual and audio output functionality of their respective communication devices 320a-320c. The embodiment of FIG. 3 does not require any pre-installed infrastructure to be present at the meeting site while still allowing enhanced communication functionality. Thus, the expense and inconvenience of setting up a special meeting room with enhanced media capabilities is not necessary. In other embodiments of the present invention, additional meeting enhancement functionality is provided via communication network 330 such as additional computational, communication, and data resources that may not be provided by the communication devices 320a-320c but which can be accessed via communication network 330 and network connection 340.

Figure 4A:
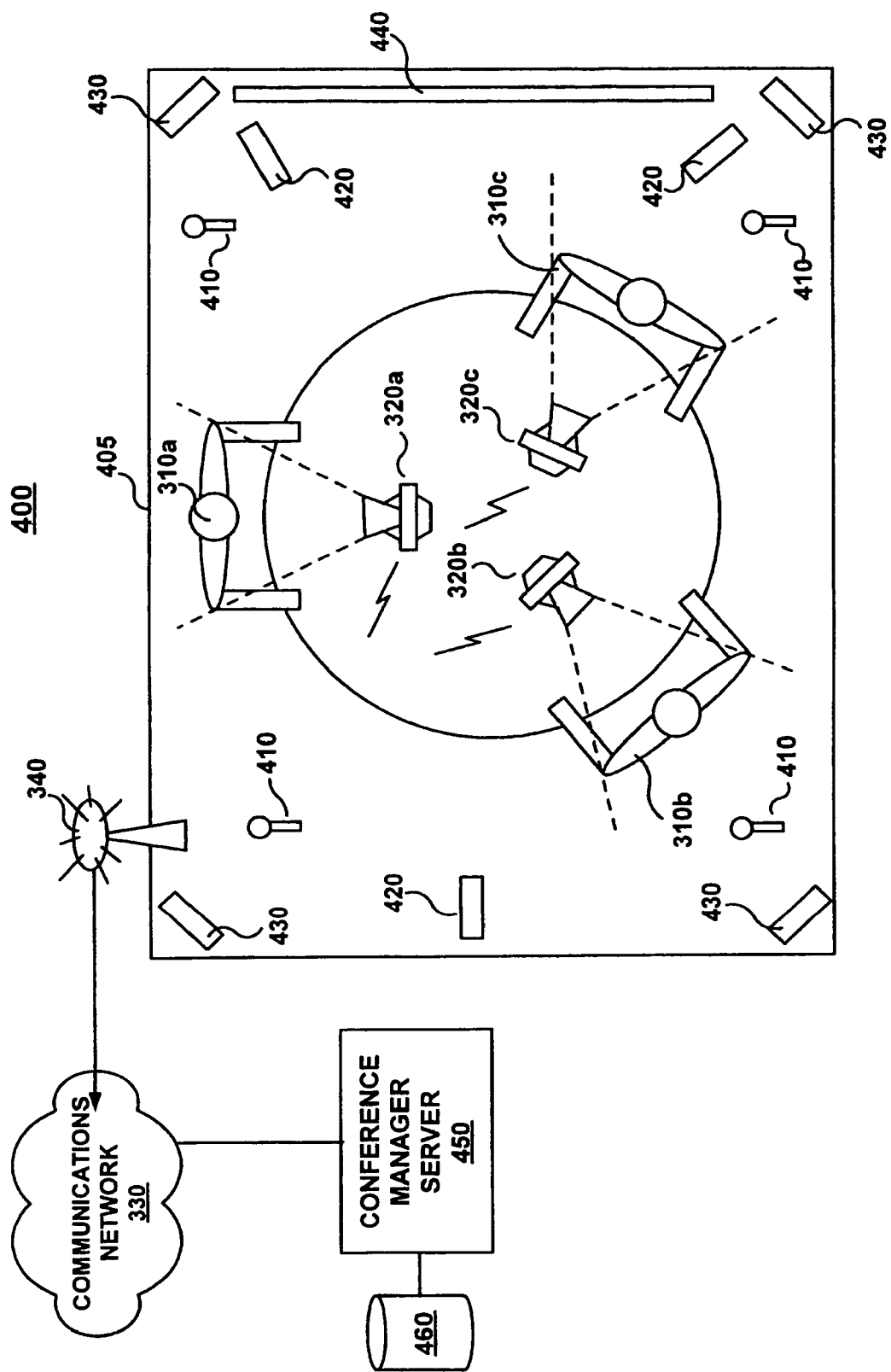
FIG. 4A is a diagram of a plurality of communication devices that are coordinated with an enhanced media environment in accordance with embodiments of the present invention.

Coordinating a Plurality of Communication Devices with an Enhanced Media Environment FIG. 4A shows a plurality of communication devices that are coordinated with an enhanced media environment in accordance with embodiments of the present invention. In FIG. 4A, a plurality of communication devices 320a-320c are communicatively coupled in the context of a meeting or other social gathering. In the embodiment of FIG. 4A, the communication devices 320a-320c are also communicatively coupled with an enhanced media environment, e.g., room 405 which comprises a plurality of microphones 410 that can be used selectively to better capture and enhance sound emanating from different locations in room 405. The enhanced media environment further comprises a plurality of cameras 420 and audio speakers 430 as well as a shared display 440. Audio speakers 430 can be used to produce spatialized 3-dimensional sound reproduction in room 405. In the embodiment of FIG. 4A, cameras 420 are directed at various locations in room 405, e.g., directed at shared display 440 and users 310a-310c. Other cameras can capture wide-angle views of activities in room 405. In embodiments of the present invention, cameras 420 are operable with pan/tilt/zoom functionality. Microphones 410, cameras 420, speakers 430, and shared display 440 are utilized in embodiments of the present invention to provide an enriched media environment for conducting meetings and/or other social gatherings. Configurations that differ from FIG. 4A in the number, location, and/or other disposition parameters of the microphones, cameras, speakers, and displays within an enhanced media environment may be utilized in embodiments of the present invention. While the present embodiments teaches the use of microphones, cameras, speakers, and a shared display in the enhanced media environment, it is noted that an enhanced media environment may comprise other combinations of these devices in embodiments of the present invention.

Figure 4B:
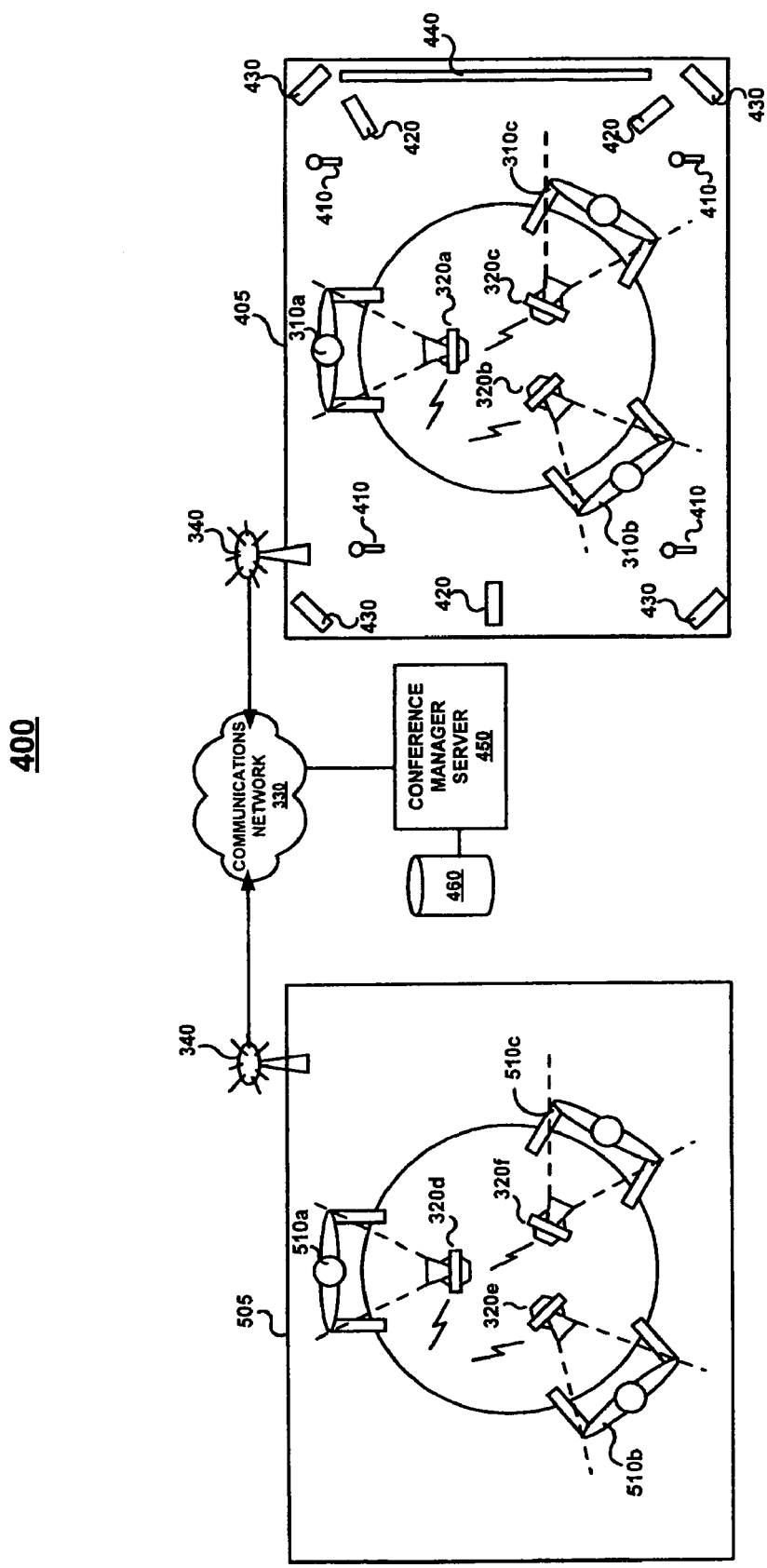
FIG. 4B is a diagram of a plurality of communication devices that are coordinated with an enhanced media environment in accordance with embodiments of the present invention.

Coordinating a Plurality of Communication Devices Across Multiple, Physically Separated Locations FIG. 4B shows an embodiment of the present invention in which a group of meeting participants, e.g., users 310a-310c, at one physical location, e.g., room 405, are communicatively coupled in a meeting or other social gathering with another group of participants 510a-510c at a second location, e.g., location 505. In the embodiment shown in FIG. 4B, location 405 is an enhanced media environment with installed infrastructure such as cameras, microphones, audio speakers, and visual displays, while location 505 has minimal installed infrastructure, as would be typical in locations such as a park, restaurant, coffee shop, or hotel room. Both locations 405 and 505 provide a communication link, e.g., network link 340, with communication network 330 that allows for communication to occur between the two sites. Additionally, the participants 510a-510c at location 505 may benefit from the additional processing and/or storage resources of server 450 and data storage 460 as described herein with reference to FIG. 4A.

More generally, embodiments of the present invention allow for coordination of an ongoing event, such as a meeting, between participants located at two or more physically separated sites. Each site may have one or more event participants, and each site has at least one communication device 100 as described herein, for example in accordance with FIG. 1. With reference to the example of FIG. 4B, each site provides a communication link 340 to a communication network 330 that allows for communication between all of the physically separated sites.

Coordination Functionality

In the embodiment of FIG. 4A, the communication devices 320a-320c are communicatively coupled with communication network 330 via network connection 340. Additionally, communication network 330 is communicatively coupled with server 450 and with data storage 460, e.g., a database. It is noted that in embodiments of the present invention, server 450 and data storage 460 are not necessarily located at the conference site itself, e.g., at room 405. Additionally, it is appreciated that in embodiments of the present invention, server 450 may comprise a single computer system, or a network of computer systems. Server 450 and data storage 460 provide additional computational and data resources that may not be available using communication devices 320a-320c only. Additionally, server 450 and/or data storage 460 can be used to archive or record the events of a given communication session.

In embodiments of the present invention, server 450 comprises computer hardware and/or software for managing and coordinating the communication session being conducted by communication devices 320a-320c. It is noted that in other embodiments of the present invention, coordination functionality for the communication session is performed by one or more of the communication devices 320a-320c used by participants in the ongoing event. In embodiments of the present invention, selection of communication devices for coordinating the communication session can be based upon the devices' available computing power or, for example, the amount of their remaining battery life. In another embodiment, the coordination functionality is distributed between server 450 and one or more of the communication devices 320a-320c. In embodiments of the present invention, components of the coordination functionality may be initiated by one or more of the communication devices 320a-320c or may be continuously running in the static infrastructure of an event site, e.g., room 405, waiting for contact from one of the communication devices to initiate the coordination.

Additionally, the various components of the coordination functionality may "discover" and connect to each other using methods for coordinating distributed processing that are well known in the art. For example, the coordination functionality may be implemented as a Web service on a server coupled with communication network 330. Communication devices 320a-320c may discover and connect to this Web service via any of the many known protocols for service discovery, such as the Universal Discovery, Description, and Integration (UDDI) protocol.

In embodiments of the present invention, coordination functionality, implemented in some embodiments by server 450, is used to establish and maintain communication between the communication devices 320a-320c used in a meeting. This can include connections arbitration and communication routing as well as authenticating meeting participants and managing access of data resources. In embodiments of the present invention, coordination functionality may, at least in part, perform processing and analysis of captured media streams, aid in control of the ongoing event and the presentation of audio and video to event participants, and produce records of the happenings of the event. This functionality can include visual view selection, visual view refinement, multi-microphone audio enhancement, and gestural perception for meeting control, as discussed in the following sections. In the embodiment shown in FIG. 4A, server 450 can also be used to manage the enhanced media environment. This functionality can include, for example, presentation of media on shared display 440, shared audio speakers 430, and/or on the communication devices 320a-320c themselves. In embodiments of the present invention, server 450 determines what resources are pre-installed at room 405. For example, server 450 can refer to a database stored in data storage 460, or it may engage in a protocol to discover the local resources. Known methods, based on standards such as the UDDI protocol and the Web Services Description Language (WSDL), may be used to implement this process of discovery and recruitment of local resources.

Figure 4C:
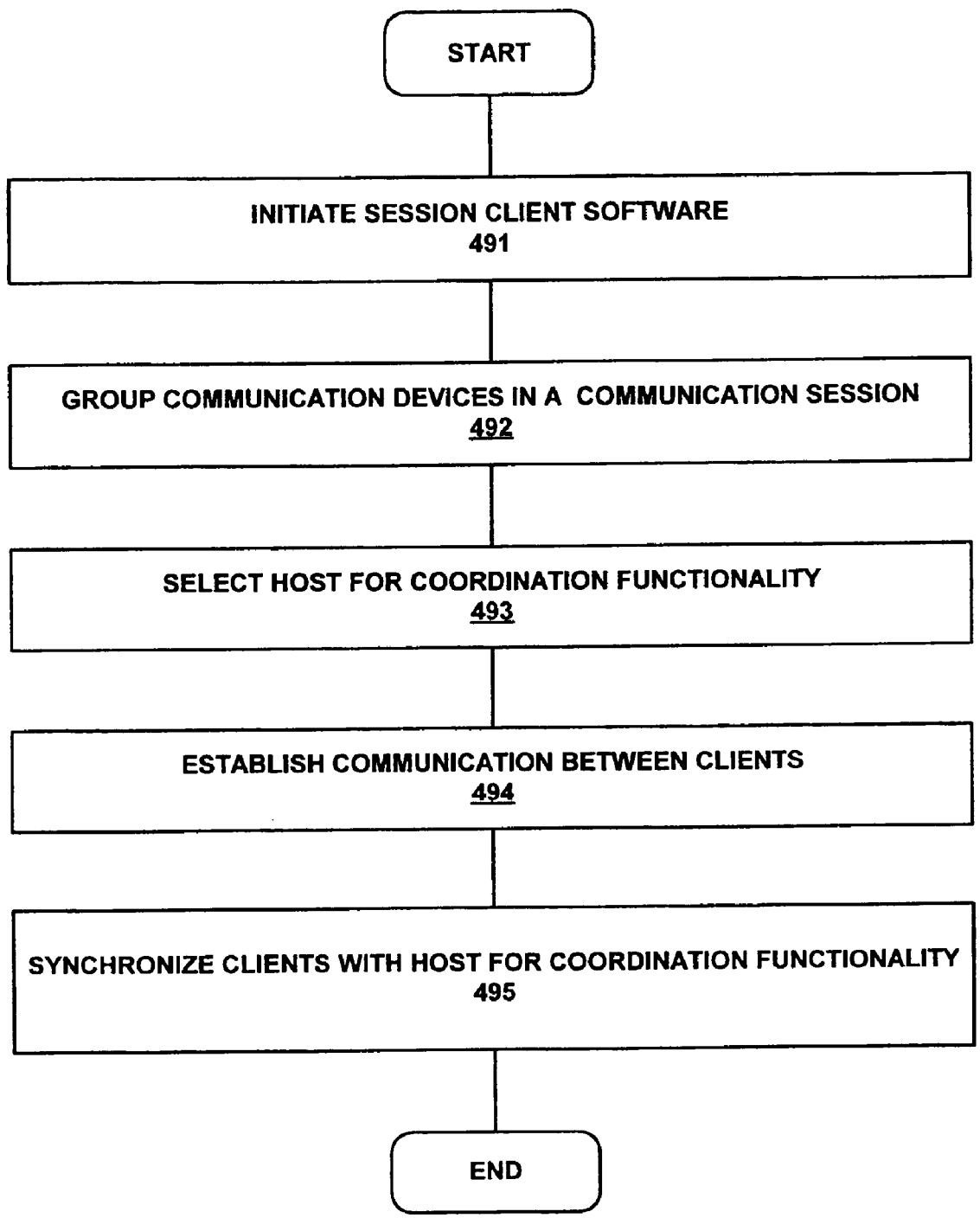
FIG. 4C is a flow chart of a method for establishing a communication session between a plurality of communication devices in accordance with embodiments of the present invention.

Establishing a Communication Session Between a Plurality of Communication Devices FIG. 4C is a flow chart of a method 490 for establishing a communication session between a plurality of communication devices in accordance with embodiments of the present invention. In step 491 of FIG. 4C, session client software is initiated on a communication device (e.g., communication device 100 of FIG. 1). In one embodiment, each event participant uses the interface of his/her respective communication device to start a session client software program resident upon each of the communication devices 100. In other embodiments of the present invention, the user may initiate the session client software using, for example, voice control, biometrics recognition, gesture recognition, etc. The session client software program typically controls actions specific to the communication device upon which it is disposed, e.g., gesture recognition, view management, user parameters, audio management, etc. The session client software program asks for an identifier for the session to be joined, and optionally for an identifier for the participant. However, event participants' identifiers may be stored on communication devices 320a-320f, server 450, data storage 460, etc., in embodiments of the present invention.

In step 492 of FIG. 4C, the communication devices 100 are grouped as a set of devices to be joined in a communication session. In one embodiment, each communication device 100 broadcasts, to the local environment, a "join meeting" message containing identifiers for both the participant and the communication session to join. The signal may be broadcast via any of the communication methods discussed in previous sections, including, for example, via the IEEE 802.11b protocol. In other embodiments, the communication devices may utilize non-standard communication protocols such as visible or infrared light, radio waves, audio waves, etc., to broadcast this message.

In some embodiments of the present invention, if one communication device senses a signal from a second device attempting to join the same identified communication session, the two communication devices engage in a mutually known protocol or handshake (pre-programmed on each client) to exchange information. Each of these two communication devices may inform the other of all additional communication devices that have previously contacted it in an attempt to join the same identified communication session. The communication devices may also exchange data such as addressing information and/or processing capabilities, etc. during this handshaking period. In this way, the communication devices may build up a list of the names, network addresses, and/or other attributes of all communication devices for the identified communication session.

In embodiments of the present invention, the communication devices 100 may listen for signals of a pre-determined format from "coordinating entities" operating in the environment, where the coordinating entities advertise a willingness to host the coordination functionality described in the previous section. In addition, the "join meeting" messages broadcast by the communication devices 100 may be sensed by coordinating entities operating in the environment. Any coordinating entity that makes contact with the communication devices 100 may facilitate in the setup of the communication session between communication devices at this physical site, and also between these communication devices and those at other physical sites that want to join the same identified communication session. As described herein with reference to FIGS. 4A and 4B, to communicate with other physical sites, the coordinating entity typically uses a network connection. If more than one site is participating in the communication session, communication devices at all sites must be able to contact the same preferred coordinating entity, or they each must be able to contact multiple coordinating entities that intercommunicate with each other and exchange communication session information. If contact between a communication device 100 and a coordinating entity is made, the communication device may inform the coordinating entity of all other communication devices of which it knows that want to join the same identified session. In turn, the coordinating entity may inform the communication device of other communication devices that wish to join the same identified session. As additional contacts are made, lists of devices wishing to join the session may continue to be exchanged and updated. In this way, the communication devices and/or a coordinating entity build up a list of all communication devices for the identified communication session.

As described herein with reference to FIG. 4A, there are service discovery methods known in the art that can be utilized in embodiments of the present invention. For example, the communication devices can indicate that they are attempting to join or initiate a communication session, provide the name of the communication session, and poll a coordinating entity to determine if other communication devices are conducting or initiating this identified communication session. In the absence of coordinating entities operating in the network, the communication devices 100 at different physical sites may contact each other directly during initialization of the communication session, and may communicate via standard network protocols. To accomplish this, at least one "portal" communication device at a given site is, in one embodiment, provided with the network address of at least one "portal" communication device at each of the other sites, so that these portal communication devices may establish cross-site communication with each other and then, if necessary, set up additional cross-site communication links between other communication devices of which the portal communication devices are aware.

In step 493 of FIG. 4C, a host for implementing the coordination functionality is selected. As described herein with reference to FIGS. 4A and 4B, in embodiments of the present invention, one or more computing devices, either one or more of the communication devices 320a-320f and/or other computers, e.g., server 450, that may be accessed by the communication devices, are then selected to host the coordination functionality. As described herein with reference to FIG. 4A, selection of the coordination host(s) may be performed using a variety of methods such as random selection, or selection of the communication device or other networked computer having the highest available computing power/memory/battery life/communication bandwidth, etc. In other embodiments, more than one communication device or other networked computer may be selected to operate the coordination functionality in distributed fashion over the network.

In step 494 of FIG. 4C, communication channels are established between session clients (running on the individual communication devices 100) and the host(s) of the coordinating functionality. These communication channels may consist of network sockets making use of standard communication protocols, but in general may consist of standard or non-standard techniques employing means such as wired or wireless links, infrared or radio frequency waves, IEEE 802.11 protocols, and IP-based or circuit-switched methods. In embodiments of the present invention, determination of the necessary communication channels and paths depends upon what devices are being used in the meeting. For example, if the coordination functionality is performed by a dedicated server (e.g., server 450), the communication devices do not need to communicate directly with each other and instead may communicate via the dedicated server. In embodiments of the present invention in which the coordination functionality is distributed to one or more of the communication devices, direct communication connections are established between the communication devices and the device or devices hosting the coordination functionality.

In step 495 of FIG. 4C, the clients synchronize with the host(s) of the coordination functionality. In embodiments of the present invention, after host(s) for the coordination functionality have been identified, the communication devices engage in a protocol to synchronize their internal clocks. More precisely, they determine the offsets between their internal clocks and some local reference clock, and they monitor any changes in these offsets during the course of the communication session. In some embodiments, the local reference clock is chosen to be that of any of the communication devices or other networked computers selected to host the coordination functionality. In one embodiment, the communication devices communicate via TCP/IP networks and utilize the network time protocol (NTP) to accomplish clock synchronization. Other suitable, known protocols for clock synchronization exist for IP, cellular telephone, and other communication networks. In one embodiment, the communication devices are equipped with global positioning system (GPS) receivers and use these to synchronize their clocks. Clock synchronization allows the sensor streams collected at a given time by one multiple communication device to be easily related to data collected by other communication devices at the same time. Furthermore, it allows the display of information across different communication devices to be coordinated in time. The quality of the clock synchronization between multiple communication devices greatly affects the performance of some functions such as the automatic director and multi-microphone audio enhancement.

Media Analysis and Processing for Creation of
Enhanced Representations of Ongoing Events In embodiments of the present invention, the coordination functionality utilizes "automatic director" methods to intelligently choose among and switch between the multiple visual input streams being captured during the ongoing event in order to compose visual output streams for display that are pleasing and of interest to human viewers of the event. The visual input streams may be captured by the communication devices and/or by the installed cameras 420 of an enhanced media environment such as in FIG. 4A, while the visual output streams are displayed on the communication devices and/or shared displays such as 440 of FIG. 4A. Any of the methods known in the art may be used to implement the "automatic director" functionality. These methods are typically based upon a set of rules that human movie and television show directors use, such as, "try to show people that are speaking," "occasionally show views of participants who are simply listening," "do not switch away from a view that has been on the screen less than some minimum amount of time," etc. The selected view can be captured by the cameras 420 disposed in room 405 as well as the visual sensors 104 of the communication devices used by event participants if they are so equipped. The view selected by the automatic director can, for example, be displayed upon shared display 440 for all event participants to view and/or upon the visual display device 107 of one or more of the communication devices 320 that are used in the communication session if they are so equipped. Additional media, e.g., film clips stored in data storage 460 or in one of the communication devices, can also be accessed and displayed to enhance the experience of the event participants. It is appreciated that the additional media may comprise a variety of media including audio and visual media. In one embodiment, when the communication devices 320a-320c are coordinated with an enhanced media environment, cameras 420 are used for capturing visual data rather than the visual sensors disposed upon the communication devices, e.g., visual sensor 104 of FIG. 1. This is beneficial in that significant bandwidth resources for the communication devices can be conserved when they are not transmitting visual data.

The coordination functionality may choose to show all or part of more than one input visual stream or other additional media on any of the visual displays. Any of the many known methods for combining multiple videos or images into a single video or image may be used. For example, different video streams may be shown in different sub-windows that may be tiled and/or overlapped within the overall window of a visual display. Video compositing methods, such as alpha-blending, may also be used instead of or in combination with window tiling and overlapping.

In embodiments of the present invention, views captured by the communication devices or other cameras in the enhanced media environment may be automatically refined to display the subjects they capture in more pleasing ways. For example, visually-based face detection, motion detection, and skin-color detection methods can be used to digitally zoom, center, and/or crop the view from a particular communication device or camera to better focus or display an event participant. The zooming, centering, and cropping parameters may be allowed to vary dynamically during the course of the event if tracking methods are used to monitor the person's position in the camera field-of-view. In embodiments of the present invention, known video color and brightness modification algorithms may be applied to render one or more of the views in a manner that is more pleasing, or so that views captured by different cameras have similar characteristics. For example, in an event involving people, it may be desirable that each person's skin color fall within a certain range of appearance, an/or it may be desirable that a given person's skin color appear the same for all views in which that person may be seen. To accomplish this, software may be applied to color-correct or brightness-correct the video obtained by each camera, so that the captured video streams are consistent with each other and with perception by the typical human eye. Furthermore, automatic brightness adjustment via software or hardware, in a manner similar to the "automatic gain control" available in many cameras at the present time, may be desirable for lightening or darkening video of a scene, so that its details may be well observed.

Embodiments of the present invention also try to apply a variety of saliency criteria that can be used by the automatic director for constructing the enhanced representation of the ongoing event. For example, if the audio level measured by a communication device is higher than that of all others in the communication session, the invention assigns a high salience to the video captured by this communication device, on the premise that it is highly likely that a person viewed by the communication device is speaking and that the view of this speaker captured by this communication device may be of interest to viewers of the event. In another embodiment, if a speech/noise discriminator classifies the audio input of a given communication device as speech, the invention assigns high salience to the video captured by this communication device, on the premise that it is highly likely that a person viewed by the communication device is speaking and that the view of this speaker captured by this communication device may be of interest to viewers of the ongoing event. In another embodiment, measurement of motion level, e.g., via frame differencing, is used as an indication that the content being captured by a camera is likely to be interesting to viewers of the ongoing event. In another embodiment, if there is a high level of mutual information between the audio signal captured by a communication device and the motion in a region of the communication device's captured video, e.g., a region selected using automatic face detection and/or skin-color detection, the invention assigns high salience to the video captured by the communication device on the premise that it is highly likely that a person viewed by the device is speaking and that the view of this speaker may be of interest to viewers of the event. Additionally, a default setting may display a wide-angle view of the event site if the coordination functionality cannot determine who is speaking, or if it determines that no one has spoken for some time.

In embodiments of the present invention, the automatic director functions are combined with user specified parameters, e.g., view selection preferences, specified by the event participants, communication device owners, or event viewers. In one embodiment, a user's profile and/or user-specified parameters are stored in the memory 103 of the user's communication device 320. In another embodiment, a user profile and/or user-specified preferences can be stored in, for example, data storage 460. Known methods in the art exist for considering high-level director rules, user suggestions and parameters, and automatic view selection criteria based, for example, upon saliency criteria such as those discussed above, to produce visual output streams from a set of cameras recording an event. In embodiments of the present invention, selection of the view presented on a given communication device is left entirely to the communication device owner's control. For example, an event participant can use designated gestures, which are detected by the visual sensor 104 and interpreted by software operating on, for example, a communication device or server 450, or a touch-pad interface on the communication device, to control which view is currently presented. For example, a user can configure his/her communication device to only display the camera view deemed most likely to be that of the person who is currently speaking.

Alternatively, the user can configure his/her communication device to also display an image of himself/herself in a portion of his/her visual display. The user may also configure his/her communication device to only display other event participants who are located at a different site.

In embodiments of the present invention, coordination functionality is also utilized to perform audio enhancement of audio data received from, for example, microphones 410 and/or communication devices 320a-320c. For example, if the locations of microphones 410 and/or communication devices 320a-320c are known, server 450 can use "beam forming" techniques to enhance the audio quality of the communication session. Beam forming refers to methods known in the art for combining multiple audio signals received by audio sensors at known locations in order to enhance the audio signals emanating from one or more locations or directions relative to the audio sensors. In another embodiment of the present invention, blind source separation techniques are used to enhance the audio quality of the communication session. Blind source separation refers to methods known in the art for separating a plurality of signals arriving at one or more sensors, often at unknown locations relative to one another, into separate component signals. The conference management functionality can also store a spatial model describing the audio characteristics of room 405 in embodiments of the present invention.

User Configuration of a Communication Device

As described above, user profiles and/or user preferences can be stored in communication devices 320a-320c or data storage 460. This information may comprise user-identifying information, e.g., user name and password, as well as other information unique to the user. For example, in one embodiment, user-specific speech recognition models may be stored to improve recognition of a specific person's speech based upon patterns and parameters extracted from prior training on the user's speech. For many different types of speech recognition systems, including those based on hidden Markov models, the user-specific speech parameters may consist of phoneme-level models and parameters that have been obtained through training on speech data obtained from a given user. These same parameters may serve to allow recognition of the speaking person, independent of what is being spoken. In general, user-specific voice models, of which many types have been described in the art, consist of parameters that may be used by some type of classifier to identify a person based on his or her speech. These parameters are typically obtained from training of this type of classifier on audio containing speech of this person. In some embodiments, the user-specific data stored on a communication device may consist of a visual description of the person's face, where this description is suitable for aiding a face recognizer to identify the person. The form of description is dependent on the type of recognizer used for face recognition by the system. Descriptions used by face recognizers known in the art include a small template image of the face, a set of coefficients for principal components of a space of facial images, a Gabor jet representation, and an "active appearance model".

In embodiments of the present invention, control of various functions provided by the invention may be implemented via gestures detected by the visual sensor on the communication device and/or cameras installed at the event site. In one embodiment, a physical aid, e.g., a pen with a colored light or laser at the end, may be used to make these gestures. In another embodiment, face and body gestures of participants are detected directly. Some examples of gestures that can be detected by embodiments of the present invention include:

- raising a physical aid, e.g., a pen with a specific light color, into the field of view of a visual sensor;
- moving a physical aid in a specific way, e.g., making a circular motion with a lighted pen;
- closing an eye for a specified duration of time;
- presenting the palm of one's hand to a visual sensor;
- raising a designated number of fingers toward the visual sensor;
- tilting one's head to the side;
- turning one's head to the side and leaning toward the edge of the camera view.

While these examples are cited specifically, it is appreciated that this is not a comprehensive listing of all of the gestures that can be detected by embodiments of the present invention.

Additionally, the user profile and/or user parameters may comprise instructions as to what action to initiate when a given gesture is detected. The coordination functionality may also take default actions based upon detection of specific gestures. For example, a given gesture can cause a record generator of the coordination functionality to place a mark in the event archive to indicate that this particular event participant thought what recently occurred or was said was significant in some way. Another gesture may indicate that the user wants to speak next. This can optionally cause the selected enhanced representation shown to other event participants or viewers to switch to a view of this user briefly, even if that user is not presently speaking. Another gesture may turn on/off the external transmission of audio and/or visual data from the user's communication device. This allows, for example, the user to participate in a private discussion that is not captured on record. For example, when a user presents the palm of his hand toward his communication device, or when a user turns his/her head to one side and leans toward another event participant, that user's communication device might automatically switch off audio capture, thus allowing the user to have a private conversation with a local event participant.

In embodiments of the present invention, an individually customized record of an ongoing event is created by each event participant. The participant can use a gesture to "bookmark" a point in time during the event that can be more readily accessed later. As a result, each user can bookmark portions of the event that are most pertinent to himself/herself. This is particularly useful when the user is reviewing or searching a record of the event for his/her personal use. The user can access a record of the event and, using the bookmarks they have set during the event, be able to go directly to a portion of the event that he/she considered important. Thus, each user can create and retrieve a customized record of the events of the event.

Organizing Groups of Communication Devices by Physical Location

In embodiments of the present invention, when establishing a communication session, the communication devices are made aware of which other communication devices in the communication session are located at the same physical location. There are several ways in which this awareness can be implemented in accordance with embodiments of the present invention. For example, each of the participants coupling his/her communication device into a communication session may be asked to specify his/her present location. All users specifying the same physical location, which is perhaps agreed upon during a verbal conversation as the event is being arranged, are grouped by the coordination functionality as being at the same physical location. Alternatively, the communication devices may broadcast signals that directly notify all other local devices of their physical proximity. For example, this occurs as part of the coordination functionality setup process described above. The broadcast signals may comprise audio signals, infrared flashing, other types of electromagnetic waves, or communication via standard network broadcast protocols in embodiments of the present invention. An iterative and/or voting process is used in one embodiment to resolve ambiguities and/or noise problems arising from use of broadcast signals. In another embodiment, communication devices that use the same network connection, e.g., network connection 340 of FIG. 4A, as the first point of contact to the network may assume that they are in the same physical location and group themselves accordingly.

In one embodiment, a coordination functionality or other service running in the local environment may inform each of the communication devices of their physical location, and allow the communication devices to group themselves if they are told that they are in the same location. Alternatively, if the communication devices are equipped with GPS receivers, they can group themselves as being at the same physical location as other communication devices that are less than some threshold distance away. In other embodiments, each communication device may triangulate its position if it can contact three or more wireless base stations simultaneously. The communication devices then intercommunicate and group themselves as being at the same physical location as other communication devices that are less than some threshold distance away. For example, network connection 340 may comprise a plurality of wireless base stations, e.g., Bluetooth base stations, etc., disposed in media enhanced environment 400. Communication devices triangulate their position with the aid of the plurality of base stations, and those devices with similar positions may then be grouped as being located at the same physical site.

In another embodiment, the static infrastructure, e.g., enhanced media environment 400 of FIG. 4A, may sense and track the location of a communication device using its cameras and microphones and inform the communication devices of their location. Additionally, if the communication device can be identified by the static infrastructure, the communication devices may be automatically grouped together, e.g., by the coordination functionality running, for example, on server 450 and/or communication devices 320a-320c. For example, there are visually-based methods used to track the location of objects, e.g., visually tracking light sources disposed upon the object. Alternatively, audio-based methods can track the location of objects that emit a characteristic sound that can be detected in isolation of other objects. As a result, the enhanced media environment 400 can track the location of the communication devices and group them accordingly.

Creating an Enhanced Representation of an Ongoing Event

Referring again to FIG. 2, in step 230 of flow chart 200, a coordinating component selectively combines inputs from the plurality communication devices 100 to create an enhanced representation of an ongoing event. As described herein with reference to FIG. 4A, input from the communication devices can be selectively combined to present a "best view" of happenings occurring in an ongoing event. Additionally, users can annotate the record of the ongoing event to create an individual record of the happenings within the event.

Embodiments of the present invention are advantageous for capturing an indexed version of the events of an ongoing event. This record of the events can be condensed to facilitate later browsing of the event by participants or other interested parties. The system can save many types of data such as a single video stream showing what was selected as the "best" view, considering all communication device and static infrastructure cameras, at each point in time as the event progressed.

As described herein with reference to FIG. 4A, intelligent director rules can be automatically implemented to create a single video stream output, with duration approximately equal to that of the communication session, that attempts to show for each moment of the event the most informative camera view or views, or the view considered "best" by some other pre-defined criteria, while conforming to constraints that cause the video output stream to be pleasing to human viewers. This output would not typically consist entirely of just one of the visual input streams, or of a combination of the visual inputs in which the combining method never changes during the course of the event. For example, this output video stream may typically show video of the person speaking, or of the person who most recently spoke, for each moment of the ongoing event, while avoiding changing views two or more times in rapid succession. In embodiments of the present invention, the camera views comprising this single video stream output may comprise automatically cropped, centered, and zoomed views of the event participants. Furthermore, individual frames of this video may be constructed from visual data captured by more than one of the visual sensors that are observing the event and are involved in the communication session. This video output stream may be transmitted to display devices visible to event participants or viewers, saved as part of a record of the event, or used for other purposes.

Additionally, the enhanced representation of an ongoing event may comprise a "best" audio output. This audio output may consist of a single audio stream, with duration approximately equal to that of the communication session, that attempts to capture for each moment of the event the most informative audio input or inputs, or the combination of inputs considered "best" by some other pre-defined criteria. This audio output would not typically consist entirely of just one of the input audio streams, or of a combination of the audio inputs in which the combining method never changes during the course of the event. For example, in some embodiments, the audio output may comprise multi-microphone enhancement of the audio signals via beam-forming or blind source separation, thereby producing a single audio signal that most clearly allows the speakers to be heard throughout the meeting.

The parameters of the multi-microphone enhancement process in these embodiments are allowed to vary as different people speak during the meeting, so that sounds emanating from different locations at different times may each be enhanced in turn. In other embodiments, no combination of multiple microphone inputs is performed, and instead, a "best" captured audio input is selected for use in the audio output for each point in time during the event. The audio output thus comprises selected segments of individual audio input feeds, concatenated together in time order to form a single audio output with a duration approximately equal to that of the communication session. The selected input audio segments do not cover time periods that overlap. In some of these embodiments, selection of the "best" audio feed to use at each point in time is determined at least in part by comparing the relative audio feed energy levels from each of the communication devices in the communication session. For example, the audio feed with the highest average energy level over some small window of time (e.g. 3 seconds) may be selected for use as the "best" audio output for the point in time corresponding to the center of that small time window.

In embodiments of the present invention, an audio classifier for distinguishing speech from noise may be further applied to cause the rejection of use of high-energy audio inputs that are not primarily composed of human speech. For example, the system may select, for use in the "best" audio output for some point in time of the ongoing event, the audio input feed, among only such feeds that are classified by an audio speech/noise classifier to contain human speech, that has the highest average audio energy in some small window around that point in time. In other embodiments, selection of the audio input feed to use at each point in time for the "best" audio output may be based on audio speech/noise classification without regard to audio energy levels. More specifically, the audio input feed judged most likely by a speech/noise classifier to contain speech over some small window of time (e.g. 3 seconds) may be selected for use in the audio output for that point in the time. Systems and methods for audio speech/noise classification are well known in the art. The audio output may be transmitted to devices capable of producing an audible signal to event participants or viewers, saved as part of a record of the event, or used for other purposes.

In embodiments of the present invention, the enhanced representation of the ongoing event also comprises a timeline index indicating when each participant spoke. In some embodiments, determination of which person is speaking may be determined by associating each participant in an event with one of the communication devices, and assuming that that person is speaking whenever the audio energy level captured by that device is higher than those of all other devices for a significant time. Alternatively, identification of speakers may be done by applying known audio-based speaker identification methods to the audio streams captured by the communication devices, by other microphones in the environment, or to combinations of these inputs. In some embodiments, to represent the identity of the speaker, a text label may be associated with each segment in the timeline index, with the text identifier being taken from storage on the communication device associated with or nearest to the speaking person. In other embodiments, identities of the speakers are represented with images associated with segments in the timeline index. These images may be captured during the ongoing event by the communication devices' visual sensors. In some embodiments, selection of the visual sensor to use to capture an image of the speaker may be based at least in part on the relative audio levels captured by the communication devices, so that the device capturing the highest audio energy level is used to take a picture, under the assumption that it is directed at the person associated with it who is currently speaking. In other embodiments, the location or direction of the speaking person is determined from a collection of microphones, and the camera oriented in the direction of interest is used to capture an image of the speaking person. The timeline index may be displayed to event participants or viewers, saved as part of a record of the event, or used for other purposes.

In one embodiment, the enhanced representation of the event includes a text transcript of what was said during the ongoing event. This can be created by applying speech recognition software to the audio streams as they are captured, to a "best" audio output stream as it is created, or to an archived audio record of the meeting. The performance of the speech recognition software can be enhanced by accessing stored audio profiles of each event participant and/or an acoustic model of the meeting room. Selection of the stored audio profiles to use may be based at least in part on the known association between communication devices used in the event and their owners. In some embodiments, the speaker identification techniques described above can be used to segment and label the text according to who the system believes spoke the words. Embodiments of the present invention are advantageous over conventional capture methods for meetings and other events because if each meeting participant owns and carries in the communication device with which he/she is associated during the event, they are able to have previously trained the communication devices to more accurately recognize their individual speech patterns, and thereby produce more accurate text transcripts of the event. The text transcript may be displayed to event participants or viewers, saved as part of a record of the event, or used for other purposes.

In one embodiment of the invention, techniques for producing summaries of audio and/or visual streams are applied to produce a condensed record of the event that may be viewed and/or listened to in less time than the duration of the original event. Many summarization techniques are known in the art for accepting an audio input, a video input, or an audio and a video input, and then analyzing this to produce a shorter output of the same modality as the input. For example, a thirty-minute audiovisual news program may be summarized by some methods to produce an audiovisual output of, for example, two minutes in duration, that is comprised entirely of content from the original input, but that discards some amount of content deemed most redundant or uninteresting according to some criteria. In the present invention, techniques such as these may be applied to the audio and/or video portion of the enhanced representation that is saved as a part of a record of the event, or it may be applied to one or more of the audio or video inputs to the coordination functionality for the event.

Figure 5:
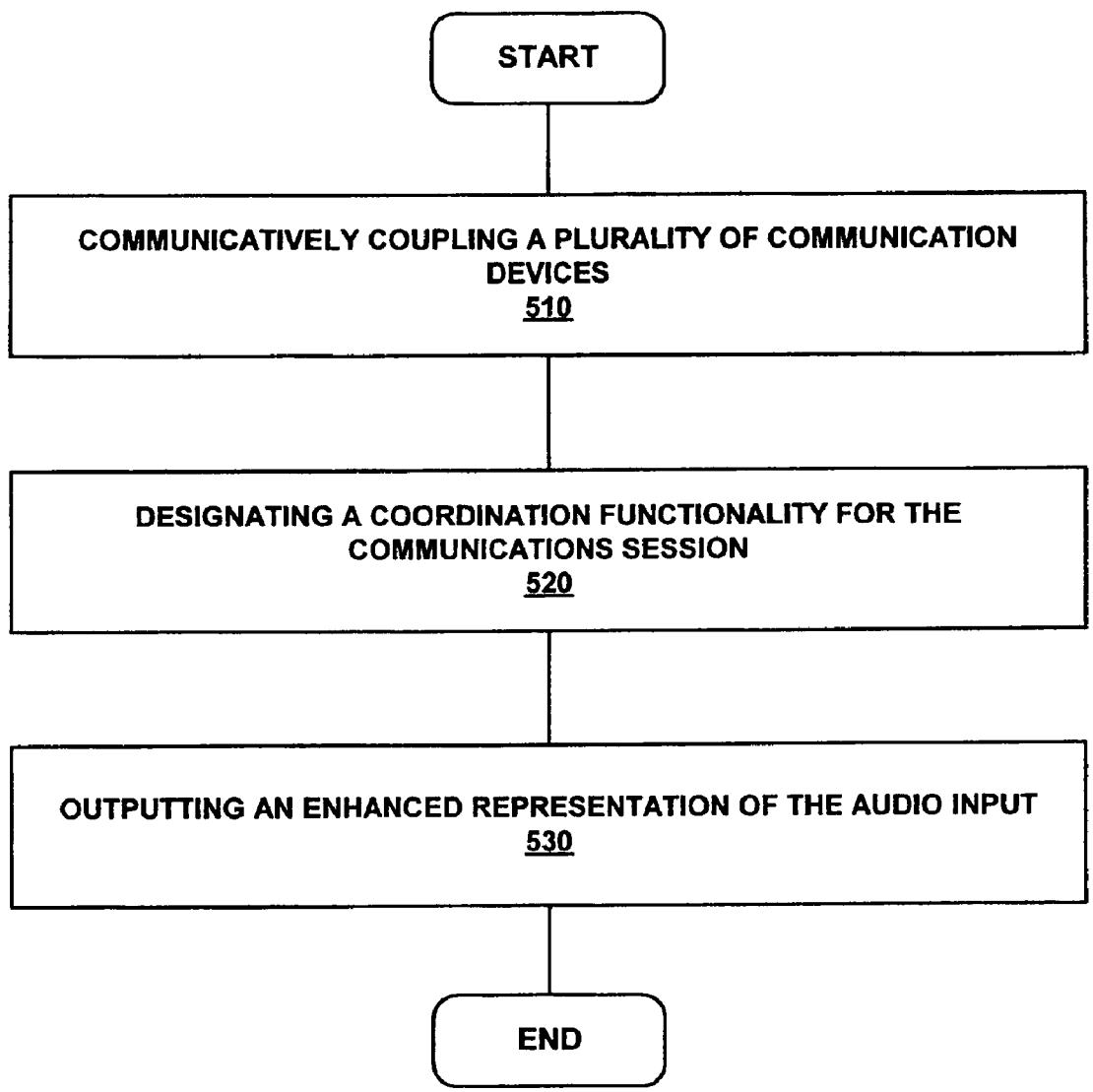
FIG. 5 is a flow chart of a communication method 500 in accordance with embodiments of the present invention.

Communication Methods Using Coordinated Communication Devices with No Prior Association FIG. 5 is a flow chart of a method 500 for creating enhanced representations of ongoing events in accordance with embodiments of the present invention. In step 510 of flow chart 500, a plurality of communication devices are communicatively coupled. As described herein with reference to step 220 of FIG. 2, a communication session is established between a plurality of communication devices. In embodiments of the present invention, the communication devices may be located at the same site, or at a plurality of separate sites. In embodiments of the present invention, the plurality of communication devices do not have and/or require prior association with each other for the purposes of establishing a communication session.

Referring again to FIG. 5, in step 520 a coordination functionality for the method is established. As described herein with reference to FIG. 4A, embodiments of the present invention audio analysis and processing, and optional user controls for selecting and composing the "best audio output", for each moment of an ongoing event, from a plurality of audio inputs. In embodiments of the present invention, this functionality is implemented by a coordination functionality. The coordination functionality can be implemented, for example, upon a dedicated conference server, one of the communication devices 100, or in a distributed system comprising one or more of the communication devices 100 and/or server 450. In embodiments of the present invention, the coordinating functionality automatically selects an audio input of the communication session that can be used in an enhanced representation of the ongoing event.

Referring again to FIG. 5, in step 530, an enhanced representation of the audio input concerning the ongoing event is output. As described herein with reference to FIG. 4A, the coordination functionality conveys to the communication devices the enhanced audio output, as the enhanced representation of the communication session. However, the user of a given communication device can override the output provided by the coordination functionality based upon user defined parameters.

Figure 6:
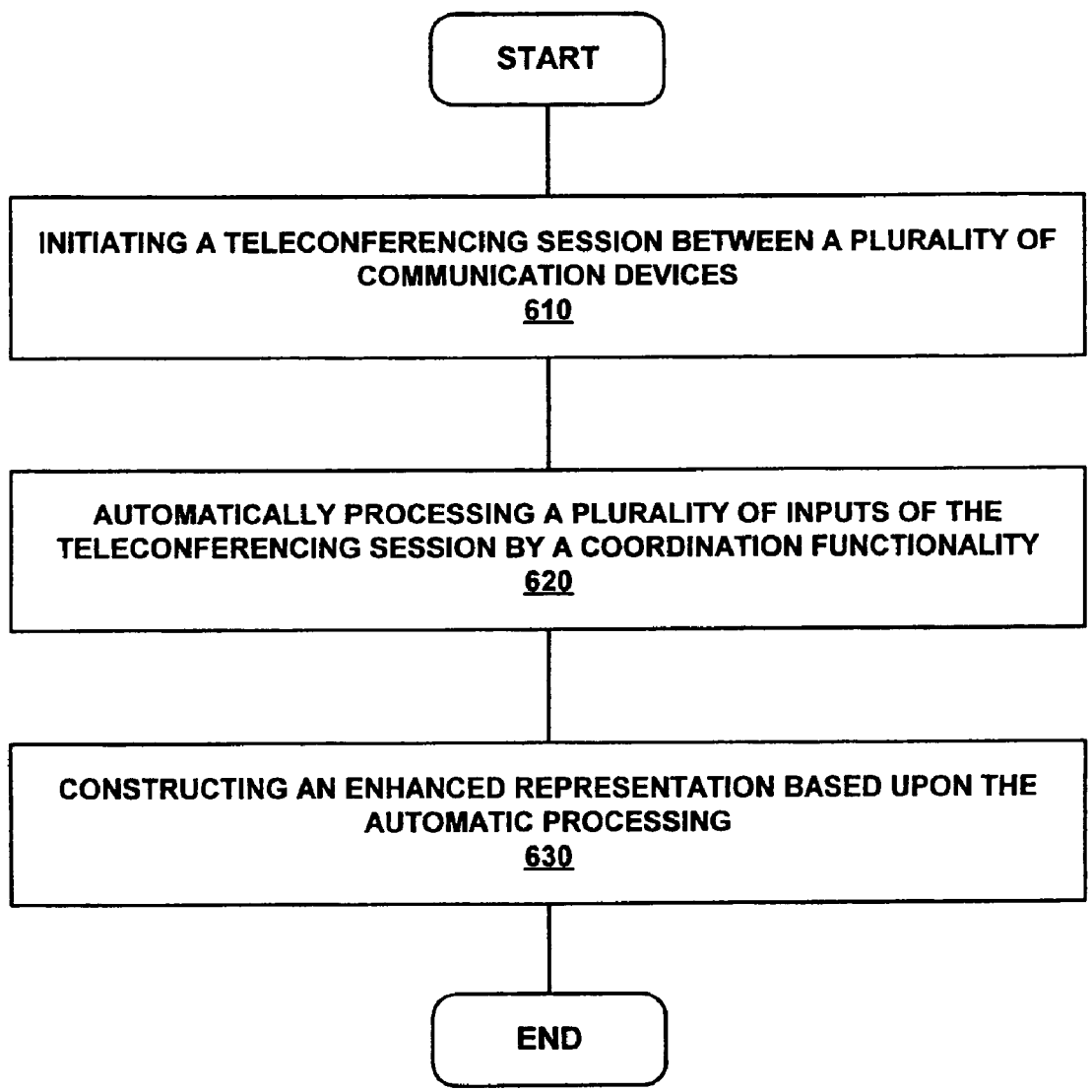
FIG. 6 is a flow chart of a method coordinating a teleconference session in accordance with embodiments of the present invention.

FIG. 6 is a flow chart 600 of a method for coordinating a teleconferencing session. In step 610 of FIG. 6, a teleconferencing session between a plurality of communication devices is initiated. As described herein with reference to FIG. 3, a plurality of personal mobile communication devices can be physically positioned to provide sensor coverage of the teleconferencing session participants, and are otherwise individually prepared for use in coordinating a teleconferencing session. In embodiments of the present invention, the communication devices do not have a prior association with each other for the purposes of establishing a communication session. In embodiments of the present invention, each communication device may be positioned stably on a surface so that one or more visual sensors attached to it may provide a view of a single teleconference participant, and so that one or more audio sensors attached to it may capture an audio signal of adequate quality of the speech produced by that participant. However, as described above, other physical configurations of the communication devices, and other criteria for their placement, may be utilized in embodiments of the present invention. Preparation of the communication devices for use in the teleconferencing session may also include activation of their attached audio and/or visual sensors and/or output devices, and may also include initiation of software programs resident on each communication device.

In step 620 of FIG. 6, a plurality of audio and/or visual inputs of the teleconferencing session are automatically processed by a coordination functionality of the teleconferencing session. In embodiments of the present invention, the coordination functionality is implemented on one or more of the communication devices and/or upon a dedicated conference manager server (e.g., server 450 of FIG. 4), and analysis and processing of the media streams captured by the plurality of communication devices is performed by it. For example, for captured audio media, this analysis and processing may include comparison of the energy levels of audio streams captured by different communication devices, or it may include combining a set of audio streams to produce an enhanced signal describing the speech of one of the session participants. For captured visual media, step 620 may include, for example, motion analysis of the video, and/or visually-based face detection to aid in selection of input visual streams for use in composition of the most interesting view of the teleconference session, e.g. of the currently speaking person, for each point in time of the teleconference.

In step 630 of FIG. 6, an enhanced representation of the communication session is constructed based upon the automatic processing of step 620, and is conveyed to the plurality of communication devices. In embodiments of the present invention, the results of the media processing and analysis of step 620 are used to aid in control of the teleconferencing session and to manage presentation of audio and video to the session participants. For example, embodiments of the present invention may select views of the teleconference to be shown on one or more visual displays controllable by the plurality of communication devices. Embodiments may also select audio streams, possibly after enhancement from step 620, for presentation on one or more audio output devices controllable by the plurality of communication devices. Furthermore, activity and gestures by session participants detected in step 620 may be used to control usage of the audio or visual sensors or output devices during the teleconference.

Computer System for Conference/Meeting Management

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "coupling," "establishing," "combining," "using," "storing," "accessing," "designating," "conveying," "selecting," "creating," "detecting, " or the like, refer to the action and processes of a computer system such as server 450 of FIGS. 4A and 4B, or similar electronic computing device, that manipulates and transforms data represented as physical (electronic) quantities within the computer system's registers and memories into other data similarly represented as physical quantities within the computer system memories or registers or other such information storage, transmission or display devices.

Figure 7:
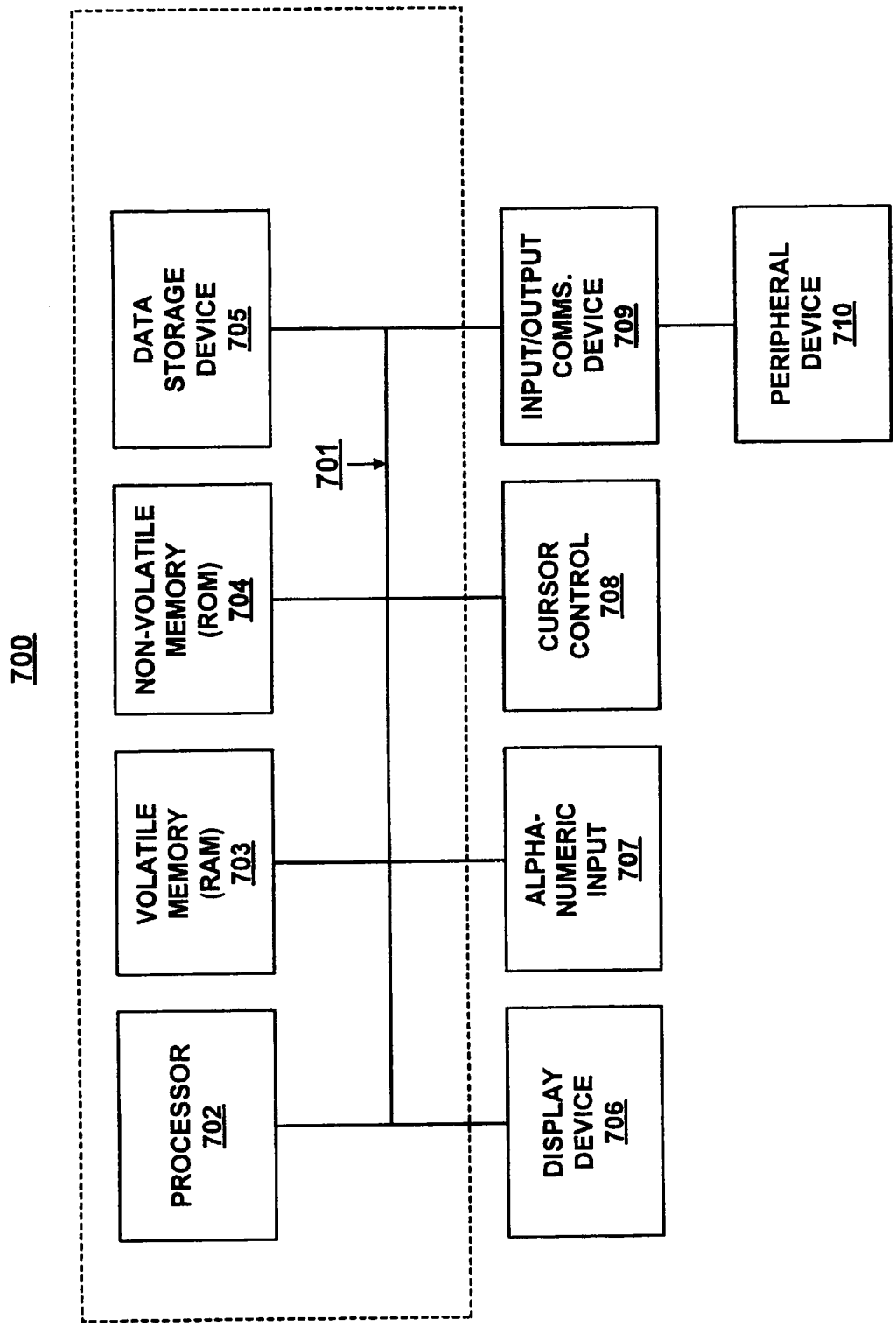
FIG. 7 is a block diagram of a computer system 700 upon which embodiments of the present invention may implemented.

With reference to FIG. 7, portions of the present invention are comprised of computer-readable and computer-executable instructions that reside, for example, in computer system 700 which is used as a part of a general purpose computer network (not shown). It is appreciated that computer system 700 of FIG. 7 is exemplary only and that the present invention can operate within a number of different computer systems including general-purpose computer systems, embedded computer systems, laptop computer systems, hand-held computer systems, stand-alone computer systems and other electronic devices such as cellular telephones.

In the present embodiment, computer system 700 includes an address/data bus 701 for conveying digital information between the various components, a central processor unit (CPU) 702 for processing the digital information and instructions, a volatile main memory 703 comprised of volatile random access memory (RAM) for storing the digital information and instructions, and a non-volatile read only memory (ROM) 704 for storing information and instructions of a more permanent nature. In addition, computer system 700 may also include a data storage device 705 (e.g., a magnetic, optical, floppy, or tape drive or the like) for storing vast amounts of data. It should be noted that the software program for performing a method for coordinating communication devices to create an enhanced representation of an ongoing event of the present invention can be stored either in volatile memory 703, data storage device 705, or in an external storage device (not shown).

Devices which are optionally coupled to computer system 700 include a display device 706 for displaying information to a computer user, an alpha-numeric input device 707 (e.g., a keyboard), and a cursor control device 708 (e.g., mouse, trackball, light pen, etc.) for inputting data, selections, updates, etc.

Furthermore, computer system 700 can include an input/output (I/O) signal unit (e.g., interface) 709 for interfacing with a peripheral device 710 (e.g., a computer network, modem, mass storage device such as data storage 460 of FIGS. 4A and 4B, etc.). Accordingly, computer system 700 may be coupled in a network, such as a client/server environment, whereby a number of clients (e.g., personal computers, workstations, portable computers, minicomputers, terminals, etc.) are used to run processes for performing desired tasks. In particular, computer system 700 can be coupled in a system for coordinating a communication session.

Figure 8:
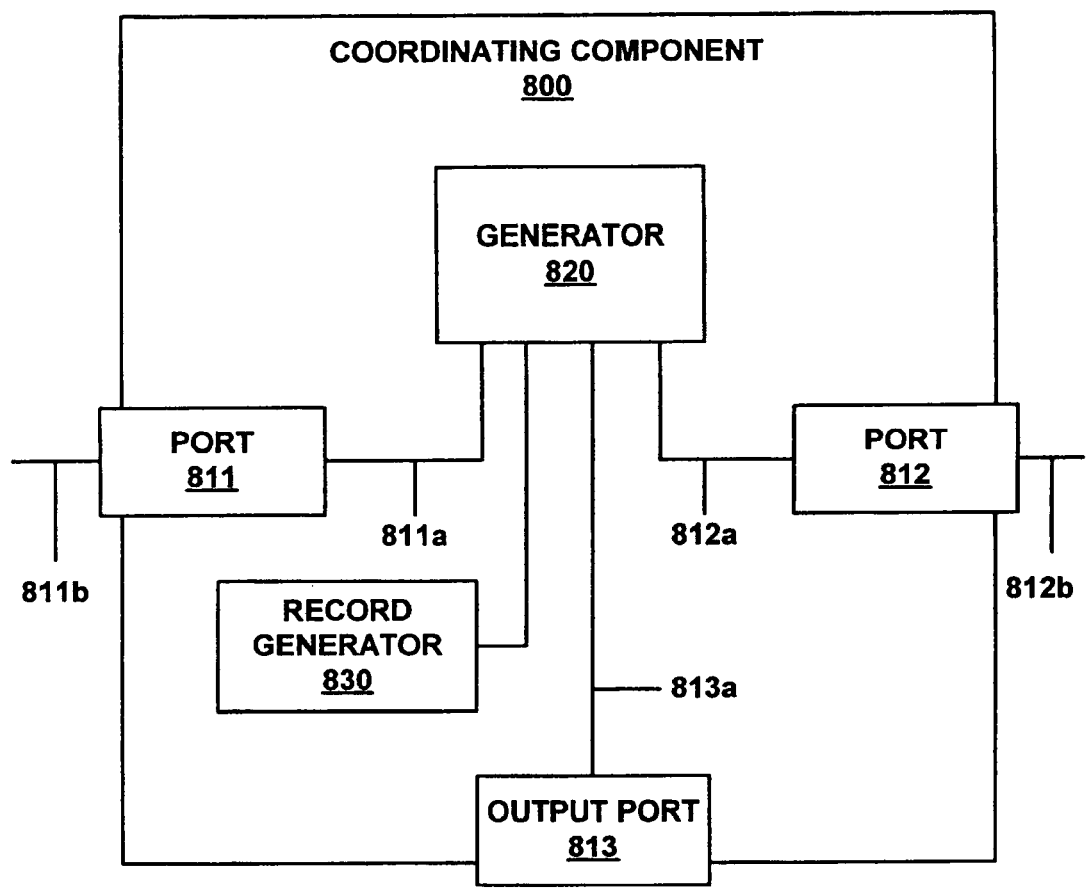
FIG. 8 is a block diagram of a coordinating component in accordance with embodiments of the present invention.

FIG. 8 is a block diagram of a coordinating component in accordance with embodiments of the present invention. In embodiments of the present invention, the coordinating component may be implemented as described herein with reference to the coordination functionality of FIG. 4A. In the embodiment of FIG. 8, coordinating component 800 comprises a first port 811 that is communicatively coupled with a generator 820 via coupling 811*a*. Coordinating component 800 further comprises a second port 812 communicatively coupled with generator 820 via coupling 812*a*. While the present embodiment recites two input ports, embodiments of the present invention are well suited for utilizing a greater number of input ports. In embodiments of the present invention, generator 820 selectively combines input from ports 811 and 812 to create an enhanced representation of an ongoing event. For example, a first input received at port 811 via coupling 811*b* can be from a communication device 100 as described herein with reference to FIG. 1. A second input received at port 812 via coupling 812*b* can be from a camera (e.g., camera 420 of FIG. 4A). Generator 820 applies various saliency criteria to construct the enhanced representation of an ongoing event. For example, coordinating component 800 may apply automatic director methods to select a visual input from either port 811 or 812 to create the enhanced representation of the ongoing event. In embodiments of the present invention, the enhanced representation of the ongoing event is output from generator 820 to output port 813 via coupling 813*a*. In embodiments of the present invention, this enhanced representation is sent to other communication devices that are communicatively coupled with coordinating component 800 via, for example, network connection 340. In embodiments of the present invention, coordinating component 800 further comprises a record generator 830. In embodiments of the present invention, record generator is used to create a customized record of the ongoing event that can be stored, for example, on one of the communication devices 100, server 450, or database 460.

The preferred embodiment of the present invention, a method and system for coordinating communication devices to create enhanced representations of an ongoing event, is thus described. While the present invention has been described in particular embodiments, it should be appreciated that the present invention should not be construed as limited by such embodiments, but rather construed according to the following claims.

What is claimed is:

1. A coordinating component for creating an enhanced representation of a communication session established between a plurality of communication devices, said coordinating component comprising:
    a first input port for receiving a first input from a first of said plurality of communication devices;
    a second input port for receiving a second input from a second of said plurality of communication devices, wherein said first of said plurality of communication devices and said second of said plurality of communication devices do not have a prior association;
    a generator for selectively combining said first input and said second input to create said enhanced representation of said communication session;
    a record generator for creating a customized record of said communication session in response to detecting a triggering event; and
    an output port for sending said enhanced representation of said communication session.

2. The coordinating component of claim 1 wherein said first input, said second input, and said enhanced representation are selected from the group consisting of audio data, visual data, and audio/visual data.

3. The coordinating component of claim 1 wherein said coordinating component is disposed upon at least one of said plurality of communication devices.

4. The coordinating component of claim 1 wherein at least one of said plurality of communication devices can be coordinated with an enhanced media environment.

5. A method for coordinating a communication session comprising:
    communicatively coupling a plurality of communication devices, each of said plurality of communication devices comprising at least one sensor, wherein said plurality of communication devices do not have a prior association with each other;
    establishing a communication session between said plurality of communication devices;
    storing a user defined parameter for creating a unique record of said communication session; and
    using a coordinating component to selectively combine inputs from said sensors of said plurality of communication devices to create an enhanced representation of said communication session.

6. The method as recited in claim 5 further comprising:
    communicatively coupling at least one of said plurality of communication devices with a network; and
    implementing said coordinating component via said network.

7. The method as recited in claim 6 further comprising:
    using one of said plurality of communication devices to implement said coordinating component.

8. The method as recited in claim 5 wherein said sensor comprises an audio sensor and wherein said plurality of communication devices further comprise:
    an audio output device;
    a visual input device; and
    a visual output device.

9. The method as recited in claim 5 further comprising:
    communicatively coupling at least one of said plurality of communication devices with an enhanced media environment.

10. A communication method comprising:
    establishing a communication session between a plurality of communication devices, wherein said plurality of communication devices do not require a prior association with each other, each of said plurality of communication devices comprising:
a bus;
a processor coupled with said bus;
a memory coupled with said bus; and
an audio system coupled with said bus;
designating a coordinating component for said communication session, said coordinating component for automatically creating an enhanced representation of a plurality of audio inputs from said plurality of communication devices;
creating a customized record of said enhanced representation; and
outputting an enhanced representation of said audio input.

11. The method as recited in claim 10 wherein said designating comprises selecting at least one of said plurality of communication devices to implement said coordinating component.

12. A computer-readable medium having computer-readable program code embodied therein for causing a computer system to perform a method for coordinating a communication session comprising:
communicatively coupling a plurality of communication devices, each of said plurality of communication devices comprising a sensor coupled with a bus;
establishing a communication session between said plurality of communication devices;
storing a user defined parameter for creating a unique record of said communication session; and
using a coordinating component to selectively combine inputs from said plurality of sensors of said plurality of communication devices to create an enhanced representation of said communication session.

13. The computer-readable medium of claim 12 wherein said method further comprises:
using one of said plurality of communication devices to implement said coordinating component.

14. A system for creating an enhanced representation of an ongoing event comprising:
a plurality of communication devices, wherein said plurality of communication devices do not have a prior association with each other, each of said plurality of communication devices comprising at least one sensor;
a communication interface for communicatively coupling said plurality of communication devices to establish a communication session concerning an ongoing event;
a coordinating component, said coordinating component for selectively combining inputs from said plurality of communication devices to create an enhanced representation of said ongoing event; and
a record generator for creating a record of said enhanced representation.

15. The system of claim 14 wherein said enhanced representation is conveyed to said plurality of communication devices.

16. The system of claim 14 wherein said plurality of communication devices are disposed at two or more physically separated locations.

17. The system of claim 16 wherein said enhanced representation comprises a teleconference meeting.

18. The system of claim 14 wherein said enhanced representation is conveyed to at least one media presentation device of an enhanced media environment.

19. The system of claim 14 wherein, for at least two of said plurality of communication devices, said at least one sensor comprises an audio sensor and wherein said enhanced representation comprises audio data created from selective combination of input from said audio sensors.

20. The system of claim 19 wherein said enhanced representation comprises a concatenation of segments of audio data created from selective combination of input from said audio sensors.

21. The system of claim 20 wherein the selection of the segments of audio data is based upon audio analysis methods selected from the group consisting of speech/noise discrimination and audio energy level comparison.

22. The system of claim 14 wherein at least one of said plurality of communication devices further comprises an audio display operable for playing a portion of said enhanced representation and a visual display operable for playing a portion of said enhanced representation.

23. The system of claim 22 wherein said enhanced representation is input from a group of sensors consisting of an audio sensor disposed within said enhanced media environment, and a visual sensor disposed within said enhanced media environment.

24. The system of claim 22 wherein said enhanced representation comprises a visual output of said ongoing event and wherein said coordinating component creates said visual output using a visual processing operation selected from the group consisting of video cropping, video resizing, video color modification, and video brightness modification.

25. The system of claim 24 wherein said visual output comprises a concatenation of selected segments corresponding to non-overlapping time segments of said ongoing event, and wherein arrangement of the non-overlapping time segments is based upon the start time of each of the non-overlapping time segments.

26. The system of claim 24 wherein the selection of said visual output is based upon visual analysis methods selected from the group consisting of face detection, motion analysis, and skin-color detection.

27. The system of claim 14 wherein said coordinating component is implemented upon one or more of said plurality of communication devices.

28. The system of claim 14 wherein at least one of said plurality of communication devices is communicatively coupled with a communication network, and wherein said coordinating component is implemented upon at least one computer system accessible via said communication network.

29. The system of claim 14 wherein said coordinating component determines a synchronization between the internal clocks of each of said plurality of communication devices.

30. The system of claim 14 wherein said coordinating component detects a human gesture based upon analysis of at least one visual input from said plurality of communication devices.

31. The system of claim 30 wherein said human gesture is selected from a group consisting of detecting a pre-defined head movement, detecting a pre-defined hand gesture, and detecting a pre-defined motion of a physical aid.

32. The system of claim 30 wherein said coordinating component excludes at least one of said plurality of communication devices as an input device for said enhanced representation in response to detecting said human gesture.

33. The system of claim 30 wherein said coordinating component appends a time notation to said enhanced representation in response to detecting said human gesture.

34. The system of claim 14 wherein at least one of said plurality of communication devices stores a user-specific data, and wherein said coordinating component utilizes said user-specific data when creating said enhanced representation.

35. The system of claim 34 wherein said user-specific data is selected from the group consisting of a name, a biographical textual data, a visual facial data, a speaker-dependent audio phoneme model, and audio voice model, a description of a human gesture, and a mapping of an action to be initiated upon detecting a recognized human gesture.

36. The system of claim 14 wherein said enhanced representation is comprised at least in part of a textual transcript obtained via application of speech recognition to said audio data.

37. The system of claim 14 wherein said enhanced representation comprises an audio/visual summary of the ongoing event, wherein said summary has a time length that is significantly less than that of the communication session.

38. The system of claim 14 wherein said enhanced representation further comprises a timeline index identifying a time period in which a participant of said ongoing event spoke.

* * * * *